(12) United States Patent
Bass et al.

(10) Patent No.: US 9,815,126 B2
(45) Date of Patent: Nov. 14, 2017

(54) KEY DUPLICATION MACHINE

(71) Applicant: Hy Ko Products, Northfield, OH (US)

(72) Inventors: Michael A. Bass, Chagrin Falls, OH (US); William R. Mutch, North Ridgeville, OH (US); Richard W. Ryai, Sr., North Royalton, OH (US); Chester O. D. Thompson, Painesville, OH (US); Robert E. Drake, Willoughby Hills, OH (US); Randall A. Porras, North Olmsted, OH (US)

(73) Assignee: HY-KO PRODUCTS COMPANY, Northfield, OH (US)

( * ) Notice: Subject to any disclaimer, the term of this patent is extended or adjusted under 35 U.S.C. 154(b) by 75 days.

(21) Appl. No.: 14/629,814

(22) Filed: Feb. 24, 2015

(65) Prior Publication Data
US 2015/0266110 A1  Sep. 24, 2015

Related U.S. Application Data

(63) Continuation of application No. 13/015,982, filed on Jan. 28, 2011, now Pat. No. 8,985,918, which is a
(Continued)

(51) Int. Cl.
*B23C 3/35* (2006.01)
*G06K 9/20* (2006.01)
(Continued)

(52) U.S. Cl.
CPC .................. *B23C 3/35* (2013.01); *G06K 9/20* (2013.01); *G06K 9/2036* (2013.01);
(Continued)

(58) Field of Classification Search
CPC ....... B23C 3/35; B23C 3/355; B23C 2235/12; B23C 2235/24; B23C 2235/32; B23C 2235/41
See application file for complete search history.

(56) References Cited

U.S. PATENT DOCUMENTS 40,480 A    3/1863  Hill
288,300 A  11/1883  Borowsky
(Continued)

FOREIGN PATENT DOCUMENTS

CH    673612    3/1990
DE   2951065    7/1981
(Continued)

OTHER PUBLICATIONS

Chinese Office Action, Application No. 200780009675.0, Hy-Ko Products Company, dated Dec. 4, 2009.
(Continued)

*Primary Examiner* — Daniel Howell
(74) *Attorney, Agent, or Firm* — McDonald Hopkins LLC

(57) ABSTRACT

Apparatus, methods, and other embodiments associated with a key duplication machine are described. In one embodiment, an assembly for duplicating a master key includes an optical imaging device, a logic, a clamping assembly, and a cutting member. The optical imaging device is capable of capturing an optical image of at least a portion of the master key. The logic is capable of determining a key pattern of the master key from the optical image of the master key. The clamping assembly is capable of clamping a key blank and the cutting member is capable of cutting a key pattern into said key blank.

16 Claims, 26 Drawing Sheets

Related U.S. Application Data continuation of application No. 13/006,714, filed on Jan. 14, 2011, now Pat. No. 8,128,322, which is a continuation of application No. 11/656,925, filed on Jan. 23, 2007, now Pat. No. 7,891,919.

(60) Provisional application No. 60/761,293, filed on Jan. 23, 2006.

(51) Int. Cl.
 *G06K 9/46* (2006.01)
 *G06K 9/48* (2006.01)

(52) U.S. Cl.
 CPC ............ *G06K 9/4661* (2013.01); *G06K 9/48* (2013.01); *B23B 2270/32* (2013.01); *B23C 2235/08* (2013.01); *B23C 2235/12* (2013.01); *B23C 2235/32* (2013.01); *B23C 2235/41* (2013.01); *G06K 2209/401* (2013.01); *Y10T 409/300952* (2015.01); *Y10T 409/301008* (2015.01); *Y10T 409/303808* (2015.01)

(56) References Cited

U.S. PATENT DOCUMENTS

| | | |
|---|---|---|
| 466,044 A | 12/1891 | Jacobs |
| 943,806 A | 12/1909 | Billings |
| 1,059,545 A | 4/1913 | Kunze |
| 1,081,472 A | 12/1913 | Tucker |
| 1,135,676 A | 4/1915 | Engelbert |
| 1,218,653 A | 3/1917 | Heidrich |
| 1,367,280 A | 2/1921 | Reiges |
| 1,390,958 A | 9/1921 | Hulbert |
| 1,440,459 A | 1/1923 | Greff |
| 1,628,637 A | 5/1927 | Shaw |
| 1,656,295 A | 1/1928 | Schechter |
| 1,674,291 A | 6/1928 | Malone |
| 1,702,488 A | 2/1929 | Baird |
| 1,750,218 A | 3/1930 | Falk |
| 1,752,668 A | 4/1930 | Johnson |
| 1,775,921 A | 9/1930 | Williams |
| 1,848,046 A | 3/1932 | Caron |
| 1,889,461 A | 11/1932 | Hansen |
| 1,923,164 A | 8/1933 | Roos |
| 1,948,260 A | 2/1934 | Fowler |
| 1,961,516 A | 6/1934 | Hansen |
| 1,978,628 A | 10/1934 | Hansen |
| 1,991,151 A | 2/1935 | Hansen |
| 2,032,820 A | 3/1936 | Turrell |
| 2,038,949 A | 4/1936 | Mintz |
| 2,098,728 A | 11/1937 | McPhee |
| 2,105,099 A | 1/1938 | Schuyler |
| 2,114,597 A | 4/1938 | Goddard |
| 2,148,668 A | 2/1939 | Yoskowitz et al. |
| 2,176,106 A | 10/1939 | Segal |
| 2,274,012 A | 2/1942 | Swayze et al. |
| 2,325,541 A | 7/1943 | Poole |
| 2,329,269 A | 9/1943 | Jacobi |
| 2,386,816 A | 10/1945 | Scholz |
| 2,430,924 A | 11/1947 | Fowle et al. |
| 2,445,041 A | 7/1948 | Scholz |
| 2,499,124 A | 2/1950 | Zipp et al. |
| 2,556,577 A | 6/1951 | Drake |
| 2,582,012 A | 1/1952 | Currier |
| 2,605,294 A | 7/1952 | Barnhart |
| 2,622,485 A | 12/1952 | Martellotti |
| 2,645,978 A | 7/1953 | Sejarto et al. |
| 2,707,335 A | 5/1955 | Falk |
| 2,728,251 A | 12/1955 | Turner |
| 2,860,884 A | 11/1958 | Sloan et al. |
| 2,929,177 A | 3/1960 | Sheps |
| 2,940,183 A | 6/1960 | Fromberg |
| 3,053,149 A | 9/1962 | Rossetti |
| 3,094,039 A | 6/1963 | Spain |
| 3,138,999 A | 6/1964 | Haggstrom |
| 3,172,969 A | 3/1965 | Haggstrom |
| 3,245,149 A | 4/1966 | Haggstrom |
| 3,257,908 A | 6/1966 | Haggstrom |
| 3,259,022 A | 7/1966 | Vietorisz |
| 3,276,328 A | 10/1966 | Schreiber et al. |
| 3,286,596 A | 11/1966 | Lieptz |
| 3,286,597 A | 11/1966 | Schwartz |
| 3,305,100 A | 2/1967 | Barbee |
| 3,323,420 A | 6/1967 | Roxburgh |
| 3,358,561 A | 12/1967 | Roxburgh et al. |
| 3,388,619 A | 6/1968 | Schreiber et al. |
| 3,418,882 A | 12/1968 | Brand |
| 3,424,056 A | 1/1969 | Stolove et al. |
| 3,429,207 A | 2/1969 | John |
| 3,430,535 A | 3/1969 | Haggstrom |
| 3,440,906 A | 4/1969 | Allen |
| 3,442,174 A | 5/1969 | Weiner et al. |
| 3,457,831 A | 7/1969 | Adler et al. |
| 3,466,747 A | 9/1969 | Patriquin et al. |
| 3,496,636 A | 2/1970 | Lieptz |
| 3,499,366 A | 3/1970 | Spain |
| RE26,848 E | 4/1970 | Simon |
| 3,599,147 A | 8/1971 | Rogers et al. |
| 3,602,092 A | 8/1971 | Richens |
| 3,625,111 A | 12/1971 | Carlo et al. |
| 3,633,451 A | 1/1972 | Lieptz |
| 3,651,573 A | 3/1972 | Kaplan |
| 3,656,402 A | 4/1972 | French |
| 3,675,536 A | 7/1972 | Hungerford, Jr. et al. |
| 3,682,041 A | 8/1972 | Essig |
| 3,707,999 A | 1/1973 | Coats |
| 3,722,341 A | 3/1973 | Hungerford, Jr. et al. |
| RE27,665 E | 6/1973 | Spain |
| 3,769,865 A | 11/1973 | Kleist |
| 3,773,360 A | 11/1973 | Timbers |
| 3,792,639 A | 2/1974 | Richens et al. |
| 3,795,174 A | 3/1974 | Oliver et al. |
| 3,796,130 A | 3/1974 | Gartner |
| 3,807,276 A | 4/1974 | Oliver |
| 3,810,416 A | 5/1974 | Nelms, Jr. |
| 3,826,555 A | 7/1974 | Matsumoto |
| 3,848,235 A | 11/1974 | Lewis et al. |
| 3,865,011 A | 2/1975 | Patriquin |
| 3,870,895 A | 3/1975 | Lax et al. |
| 3,880,047 A | 4/1975 | Dosier |
| 3,884,121 A | 5/1975 | Agius |
| 3,902,382 A | 9/1975 | Lieptz |
| 3,919,589 A | 11/1975 | Hanak |
| 3,919,920 A | 11/1975 | Schlage |
| 3,945,298 A | 3/1976 | Cockroft |
| 3,955,179 A | 5/1976 | Planke |
| 3,956,968 A | 5/1976 | Crasnianski |
| 3,978,764 A | 9/1976 | Patriquin |
| 3,981,214 A | 9/1976 | Wich |
| 4,012,991 A | 3/1977 | Uyeda |
| 4,019,415 A | 4/1977 | Wich |
| 4,023,464 A | 5/1977 | Zion |
| 4,051,748 A | 10/1977 | Sherman |
| 4,062,261 A | 12/1977 | Stahl |
| 4,088,060 A | 5/1978 | Johns |
| 4,090,303 A | 5/1978 | Uyeda |
| 4,092,806 A | 6/1978 | Wich |
| 4,105,340 A | 8/1978 | Kempf |
| 4,117,763 A | 10/1978 | Uyeda |
| 4,121,292 A | 10/1978 | Galanis et al. |
| 4,132,151 A | 1/1979 | Weber |
| D251,365 S | 3/1979 | Lipinski |
| 4,143,582 A | 3/1979 | Heimann |
| 4,166,949 A | 9/1979 | Pold et al. |
| 4,171,161 A | 10/1979 | Jung |
| 4,172,632 A | 10/1979 | Holmes, Jr. |
| 4,188,163 A | 2/1980 | Juskevic |
| 4,223,791 A | 9/1980 | Taggart |
| 4,233,746 A | 11/1980 | Troillet |
| D257,758 S | 1/1981 | Limacher |
| 4,251,173 A | 2/1981 | Saucedo |
| 4,256,423 A | 3/1981 | Juskevic |
| 4,281,379 A | 7/1981 | Austin |
| 4,283,859 A | 8/1981 | Roland |

(56) References Cited

U.S. PATENT DOCUMENTS

| | | |
|---|---|---|
| 4,294,096 A | 10/1981 | Heimann |
| 4,300,042 A | 11/1981 | Oldenkamp et al. |
| 4,300,170 A | 11/1981 | Sakamoto |
| 4,300,836 A | 11/1981 | Holmes et al. |
| 4,301,373 A | 11/1981 | Sjodin |
| 4,354,780 A | 10/1982 | Bougiouris |
| 4,359,299 A | 11/1982 | Sagarian |
| 4,373,414 A | 2/1983 | Agius |
| 4,426,179 A | 1/1984 | Jefferson |
| 4,432,142 A | 2/1984 | Korsak |
| 4,433,487 A | 2/1984 | Roland |
| 4,437,150 A | 3/1984 | Dahlgren, Jr. et al. |
| 4,453,432 A | 6/1984 | Widen |
| 4,468,994 A | 9/1984 | Lieptz |
| 4,472,056 A | 9/1984 | Nakagawa et al. |
| 4,479,673 A | 10/1984 | Inaba et al. |
| 4,521,142 A | 6/1985 | Juskevic |
| 4,525,908 A | 7/1985 | Bernstein |
| 4,526,498 A | 7/1985 | Fieldhouse |
| 4,541,760 A | 9/1985 | Zoueki |
| 4,545,569 A | 10/1985 | Schroder et al. |
| 4,551,046 A | 11/1985 | Kinas |
| 4,553,844 A | 11/1985 | Nakagawa et al. |
| 4,557,488 A | 12/1985 | Litherland |
| 4,558,215 A | 12/1985 | Kaneko et al. |
| 4,562,759 A | 1/1986 | Schmitt |
| 4,592,683 A | 6/1986 | Wu |
| 4,601,185 A | 7/1986 | Sheldon |
| 4,614,465 A | 9/1986 | Wu |
| 4,625,107 A | 11/1986 | Planke |
| 4,638,567 A | 1/1987 | Leversee |
| 4,647,028 A | 3/1987 | Yang |
| 4,648,585 A | 3/1987 | Yang |
| 4,651,604 A | 3/1987 | Almblad et al. |
| 4,652,738 A | 3/1987 | Nishihara et al. |
| 4,652,765 A | 3/1987 | Nishihara |
| 4,653,104 A | 3/1987 | Tamura |
| 4,656,590 A | 4/1987 | Ace |
| 4,657,448 A | 4/1987 | Alexander |
| 4,666,351 A | 5/1987 | Marchal |
| 4,671,711 A | 6/1987 | Steinbach et al. |
| 4,677,835 A | 7/1987 | Almblad |
| 4,679,331 A | 7/1987 | Koontz |
| 4,687,389 A | 8/1987 | Santii et al. |
| 4,697,300 A | 10/1987 | Warlop |
| 4,710,808 A | 12/1987 | Hoogenboom et al. |
| 4,717,294 A | 1/1988 | Grasser |
| 4,741,652 A | 5/1988 | Marchal |
| 4,767,110 A | 8/1988 | Yang |
| 4,780,032 A | 10/1988 | Uyeda et al. |
| 4,783,829 A | 11/1988 | Miyakawa et al. |
| 4,803,371 A | 2/1989 | Durland |
| 4,805,224 A | 2/1989 | Koezuka et al. |
| 4,809,341 A | 2/1989 | Matsui et al. |
| 4,821,200 A | 4/1989 | Oberg |
| 4,821,393 A | 4/1989 | Spigarelli |
| 4,839,913 A | 6/1989 | Annis et al. |
| 4,845,764 A | 7/1989 | Ueda et al. |
| 4,848,116 A | 7/1989 | Lizotte |
| 4,853,866 A | 8/1989 | Andrada Galan et al. |
| 4,868,559 A | 9/1989 | Pinnow |
| 4,898,504 A | 2/1990 | Agius et al. |
| 4,899,391 A | 2/1990 | Cimino et al. |
| 4,909,892 A | 3/1990 | Quinn et al. |
| 4,929,129 A | 5/1990 | Dickson |
| 4,929,843 A | 5/1990 | Chmielewski, Jr. et al. |
| 4,941,335 A | 7/1990 | Allen |
| 4,969,782 A | 11/1990 | Castain |
| 4,971,489 A | 11/1990 | Womack |
| 4,993,291 A | 2/1991 | Sopko |
| 4,998,349 A | 3/1991 | Killeen |
| 5,029,459 A | 7/1991 | Almblad |
| 5,043,144 A | 8/1991 | Gordon et al. |
| 5,056,204 A | 10/1991 | Bartschi |
| 5,058,940 A | 10/1991 | Hart |
| 5,083,759 A | 1/1992 | Pollak et al. |
| 5,088,864 A | 2/1992 | Yanagida |
| 5,094,538 A | 3/1992 | Reedman et al. |
| 5,096,346 A | 3/1992 | Ueda |
| 5,111,056 A | 5/1992 | Yoshimura et al. |
| 5,119,190 A | 6/1992 | Lemelson |
| 5,122,018 A | 6/1992 | Zion |
| 5,127,532 A * | 7/1992 | Cimino .................... G06K 9/00 211/120 |
| 5,128,531 A | 7/1992 | Fadel |
| 5,130,064 A | 7/1992 | Smalley et al. |
| 5,139,246 A | 8/1992 | Yakou |
| 5,144,561 A | 9/1992 | Soper |
| 5,146,689 A | 9/1992 | Roland |
| 5,165,315 A | 11/1992 | Terada |
| 5,167,171 A | 12/1992 | Heredia |
| 5,171,112 A | 12/1992 | Roland |
| 5,192,469 A | 3/1993 | Smalley et al. |
| 5,201,203 A | 4/1993 | Almblad |
| 5,229,619 A | 7/1993 | Van Amstel |
| 5,244,321 A | 9/1993 | Sopko |
| 5,255,199 A | 10/1993 | Barkman et al. |
| 5,259,708 A | 11/1993 | Brice |
| 5,271,698 A | 12/1993 | Heredia et al. |
| 5,293,687 A | 3/1994 | Willoughby, Jr. et al. |
| 5,307,151 A | 4/1994 | Hof et al. |
| 5,308,360 A | 5/1994 | Neitzke et al. |
| 5,311,286 A | 5/1994 | Pike |
| 5,311,756 A | 5/1994 | Villani |
| 5,311,758 A | 5/1994 | Neitzke et al. |
| 5,314,274 A | 5/1994 | Heredia et al. |
| D348,393 S | 7/1994 | Neitzke et al. |
| 5,330,168 A | 7/1994 | Enomoto et al. |
| 5,351,409 A | 10/1994 | Heredia |
| 5,360,299 A | 11/1994 | Oliana |
| 5,363,463 A | 11/1994 | Kleinerman |
| 5,365,812 A | 11/1994 | Harnden |
| 5,382,784 A | 1/1995 | Eberhardt |
| 5,393,967 A | 2/1995 | Rice et al. |
| 5,416,591 A | 5/1995 | Yoshimura et al. |
| 5,429,202 A | 7/1995 | Millard et al. |
| 5,441,369 A | 8/1995 | Foscan et al. |
| 5,443,339 A | 8/1995 | Heredia et al. |
| 5,485,399 A | 1/1996 | Saigo et al. |
| 5,496,138 A | 3/1996 | Drori |
| 5,497,888 A | 3/1996 | Michaels et al. |
| 5,503,785 A | 4/1996 | Crump et al. |
| 5,515,903 A | 5/1996 | Hronas et al. |
| 5,517,299 A | 5/1996 | Teratani et al. |
| 5,538,374 A | 7/1996 | Cole et al. |
| 5,543,103 A | 8/1996 | Hogan et al. |
| 5,545,367 A | 8/1996 | Bae et al. |
| 5,552,992 A | 9/1996 | Hunter |
| 5,555,176 A | 9/1996 | Menhennett et al. |
| 5,556,240 A | 9/1996 | Almblad |
| 5,583,443 A | 12/1996 | McMurtry et al. |
| 5,592,728 A | 1/1997 | Susnjara |
| 5,594,652 A | 1/1997 | Penn et al. |
| 5,607,267 A | 3/1997 | Heredia et al. |
| 5,617,323 A | 4/1997 | Stansberry et al. |
| RE35,518 E | 5/1997 | Sussina |
| 5,630,332 A | 5/1997 | Aldieri et al. |
| 5,660,509 A | 8/1997 | Cole et al. |
| 5,671,523 A | 9/1997 | Juchinewicz |
| 5,676,504 A | 10/1997 | Mueller et al. |
| 5,677,522 A | 10/1997 | Rice et al. |
| 5,711,643 A | 1/1998 | Parr et al. |
| 5,739,766 A | 4/1998 | Chaloux |
| 5,764,156 A | 6/1998 | Chaloux |
| 5,771,176 A | 6/1998 | Froehlich et al. |
| 5,807,042 A | 9/1998 | Almblad et al. |
| 5,855,836 A | 1/1999 | Leyden et al. |
| 5,886,775 A | 3/1999 | Houser et al. |
| 5,906,365 A | 5/1999 | Wu |
| 5,908,273 A | 6/1999 | Titus et al. |
| 5,926,388 A | 7/1999 | Kimbrough et al. |
| 5,940,229 A | 8/1999 | Baumgarten |
| 5,964,554 A | 10/1999 | Drori |
| 5,966,457 A | 10/1999 | Lemelson |

(56) References Cited

U.S. PATENT DOCUMENTS

| | | | |
|---|---|---|---|
| 5,982,491 A | 11/1999 | Breyer et al. | |
| 5,984,597 A | 11/1999 | Chen | |
| 5,997,224 A | 12/1999 | Beauregard et al. | |
| 5,997,795 A | 12/1999 | Danforth et al. | |
| 6,053,677 A | 4/2000 | Juchinewicz | |
| 6,059,495 A | 5/2000 | Mueller et al. | |
| 6,064,747 A | 5/2000 | Wills et al. | |
| 6,065,911 A | 5/2000 | Almblad et al. | |
| 6,082,580 A | 7/2000 | Mueller et al. | |
| 6,094,953 A | 8/2000 | Evans | |
| 6,152,662 A | 11/2000 | Titus et al. | |
| 6,175,638 B1 | 1/2001 | Yanovsky | |
| 6,179,531 B1 | 1/2001 | Jaw | |
| 6,185,311 B1 | 2/2001 | Yanovsky et al. | |
| 6,186,711 B1 | 2/2001 | Mueller | |
| 6,243,960 B1 | 6/2001 | Andrews et al. | |
| 6,321,430 B1 | 11/2001 | Goldman et al. | |
| D455,104 S | 4/2002 | Hillman et al. | |
| 6,406,227 B1* | 6/2002 | Titus | B23C 3/35 356/607 |
| 6,415,931 B1 | 7/2002 | Mueller | |
| 6,449,381 B1 | 9/2002 | Yanovsky et al. | |
| 6,478,515 B1 | 11/2002 | Mueller | |
| 6,543,972 B1 | 4/2003 | Cimino | |
| 6,588,995 B2 | 7/2003 | Wills et al. | |
| 6,602,030 B1 | 8/2003 | Markbreit | |
| 6,612,142 B1 | 9/2003 | Capwell | |
| 6,641,339 B2 | 11/2003 | Chies et al. | |
| 6,647,308 B1 | 11/2003 | Prejean | |
| 6,687,565 B2 | 2/2004 | Wetterlin et al. | |
| 6,711,557 B1 | 3/2004 | Palaniappan | |
| 6,801,829 B2 | 10/2004 | Kawai | |
| 6,817,814 B2 | 11/2004 | Mueller | |
| 6,836,553 B2 | 12/2004 | Campbell et al. | |
| 6,839,449 B1 | 1/2005 | Campbell et al. | |
| 6,839,451 B2 | 1/2005 | Campbell et al. | |
| 6,895,100 B1 | 5/2005 | Pacenzia et al. | |
| 6,959,862 B2 | 11/2005 | Neumark | |
| 6,965,911 B1 | 11/2005 | Coffman et al. | |
| 7,010,498 B1 | 3/2006 | Berstis | |
| 7,111,894 B2 | 9/2006 | Kora et al. | |
| 7,114,436 B1 | 10/2006 | Mueller | |
| 7,114,894 B2 | 10/2006 | Mueller et al. | |
| 7,163,364 B2 | 1/2007 | Foscan et al. | |
| 7,214,011 B2 | 5/2007 | Ryai, Sr. et al. | |
| 7,484,446 B1 | 2/2009 | Gula | |
| 7,643,685 B2 | 1/2010 | Miller | |
| 7,890,878 B2 | 2/2011 | Bass et al. | |
| 7,891,919 B2 | 2/2011 | Bass et al. | |
| 7,918,629 B2 | 4/2011 | Belflower et al. | |
| 8,128,322 B2* | 3/2012 | Bass | B23C 3/35 409/81 |
| 8,287,215 B2 | 10/2012 | Freeman et al. | |
| 8,532,809 B2 | 9/2013 | Freeman | |
| 8,585,029 B2 | 11/2013 | Ryai, Sr. | |
| 8,634,655 B2 | 1/2014 | Thompson et al. | |
| 8,644,619 B2 | 2/2014 | Thompson et al. | |
| 9,308,590 B2* | 4/2016 | Bass | B23C 3/35 |
| 2001/0033781 A1 | 10/2001 | Wills et al. | |
| 2001/0056385 A1 | 12/2001 | Timms et al. | |
| 2002/0031251 A1 | 3/2002 | Campbell et al. | |
| 2002/0168241 A1 | 11/2002 | David et al. | |
| 2002/0191849 A1 | 12/2002 | Campbell et al. | |
| 2003/0145499 A1 | 8/2003 | Tarter et al. | |
| 2003/0154135 A1 | 8/2003 | Covington et al. | |
| 2003/0205070 A1 | 11/2003 | Chaum | |
| 2004/0024486 A1 | 2/2004 | Almblad et al. | |
| 2004/0036595 A1 | 2/2004 | Kenny et al. | |
| 2004/0095380 A1 | 5/2004 | Bass et al. | |
| 2004/0253067 A1 | 12/2004 | Bosch | |
| 2005/0000052 A1 | 1/2005 | Byles | |
| 2005/0216120 A1 | 9/2005 | Rosenberg et al. | |
| 2006/0003676 A1 | 1/2006 | Bernard et al. | |
| 2006/0147289 A1 | 7/2006 | Gimelfarb et al. | |
| 2007/0224008 A1 | 9/2007 | Bass et al. | |
| 2007/0234614 A1 | 10/2007 | Tarter et al. | |
| 2008/0145163 A1 | 6/2008 | Freeman et al. | |
| 2008/0252551 A1 | 10/2008 | Kubo et al. | |
| 2009/0074528 A1 | 3/2009 | Hadad | |
| 2009/0180664 A1 | 7/2009 | Efstathiades et al. | |
| 2011/0262240 A1 | 10/2011 | Mutch et al. | |

FOREIGN PATENT DOCUMENTS

| | | |
|---|---|---|
| EP | 0053730 | 10/1981 |
| EP | 0133091 | 2/1985 |
| EP | 0835720 | 4/1998 |
| EP | 1976656 | 10/2014 |
| ES | 2017240 | 1/1991 |
| FR | 2499435 | 8/1982 |
| GB | 2276106 | 9/1994 |
| JP | S59201708 | 11/1984 |
| JP | S63-311108 | 12/1988 |
| JP | S63-311109 | 12/1988 |
| JP | H04-250911 | 9/1992 |
| MX | 291113 | 1/2007 |
| WO | WO90/03867 | 4/1990 |
| WO | WO91/13535 | 9/1991 |
| WO | WO96/19309 | 6/1996 |
| WO | WO01/57472 | 8/2001 |
| WO | WO0201480 | 1/2002 |
| WO | WO2005042196 | 5/2005 |
| WO | WO2007087389 | 8/2007 |
| WO | WO2012096685 | 7/2012 |

OTHER PUBLICATIONS

Chinese Office Action, Application No. 201080024166.7, Hy-Ko Products Company, dated Dec. 6, 2013.

Chinese Office Action, Application No. 201080024166.7, Hy-Ko Products Company, dated Sep. 30, 2014.

Chinese Office Action, Application No. 201080024163.3, Hy-Ko Products Company, dated Aug. 1, 2013.

Supplementary European Search Report, Application No. 07709849.9-1702/ 1976656, Hy-Ko Products Company, dated May 15, 2013.

Extended European Search Report, Application No. 07709849.9-1702/ 1976656, Hy-Ko Products Company, dated Apr. 26, 2013.

European Communication pursuant to Article 94(3) EPC, Application No. 10 770 489.2-1901, Hy-Ko Products, dated Jun. 27, 2014.

Supplementary European Search Report, Application No. 10770489.2-1901/2424690, Hy-Ko Products, dated Nov. 12, 2013.

Extended European Search Report, 10770489.2-1901 /2424690, Hy-Ko Products, dated Oct. 25, 2013.

European Communication pursuant to Article 94(3) EPC, Application No. 12 003 030.9-1702, Hy-Ko Products company, dated Mar. 20, 2014.

European Communication pursuant to Article 94(3) EPC, Application No. 12 003 030.9-1702, Hy-Ko Products company, dated Jul. 30, 2013.

Extended European Search Report, Application No. 12003030.9-2302, Hy-Ko Products Company, dated Sep. 4, 2012.

European Communication pursuant to Article 94(3) EPC, Application No. 03 767 220.1-2201, Hy-Ko Products, dated Aug. 18, 2010.

European Supplementary Search Report, Application No. 03767220.1-2201, Hy-Ko Products, dated Jul. 18, 2007.

Mexican Office Action, Application No. MX/A/2011/011630, Hy-Ko Products, dated Oct. 30, 2014.

Mexican Office Action, Application No. MX/A/2011/011630, Hy-Ko Products, dated Apr. 9, 2014.

International Preliminary Report on Patentability, PCT/US2011/034564, Mutch, William R. et al., dated Jul. 16, 2013.

International Search Report and the Written Opinion of the International Searching Authority, PCT/US2011/034564, Hy-Ko Products Company, dated Jul. 15, 2011.

International Preliminary Report on Patentability, PCT/US2010/033414, Hy-Ko Products et al., dated Nov. 1, 2011.

International Search Report and the Written Opinion of the International Searching Authority, PCT/US2010/033414, Hy-Ko Products, dated Aug. 18, 2010.

(56) References Cited

OTHER PUBLICATIONS

International Preliminary Report on Patentability, PCT/US2007/002015, Hy-Ko Products Company, dated Jul. 29, 2008.
International Search Report and the Written Opinion of the International Searching Authority, PCT/US2007/02015, Hy-Ko Products Company, dated Sep. 28, 2007.
International Preliminary Report on Patentability, PCT/US2010/033421, Hy-Ko Products et al., dated Nov. 1, 2011.
International Search Report and the Written Opinion of the International Searching Authority, PCT/US2010/033421, Hy-Ko Products, Sep. 17, 2010.
Giuliani Productivity Through Flexibility, Multicode CCE-1, 2 pages.
Giuliani Productivity Through Flexibility, Multicode CCE-2, 3 pages.
Farzin Mokhtarian and Hiroshi Murase, Silhouette-Based Object Recognition through Curvature Scale Space, IEEE, Proceedings from Fourth International Conference on Computer Vision, 1993, pp. 269-274.
Ihtisham Kabir, A Computer Vision System Using Fast, One Pass Algorithms, (Thesis), Graduate Division of the University of California, Davis, 1986 pp. 1-164.
Roger D. Quinn et al., Design of an Agile Manufacturing Workcell for Light Mechanical Applications, Apr. 1996, pp. 858-863, Proceedings from the 1996 IEEE International Conference on Robotics and Automation, Minneapolis, Minnesota.
Anil K. Jain, Fundamentals of Digital Image Processing, Ch. 9, Image Analysis and Computer Vision, University of California, Davis, 1989, pp. 342-430, Prentice Hall, Inc., Englewood Cliffs, NJ.
Amir Novini, Fundamentals of Machine Vision Lighting, IEEE, Proceedings of Northcon 93 Electrical and Electronics convention, 1993, pp. 38-46.
Wesley E. Snyder, Industrial Robots Computer Interfacing and Control, Ch., 13 Computer Vision, North Carolina State University, 1985, pp. 248-283, Prentice-Hall, Inc., Englewood, NJ.
European Search Report for European Patent Application No. 12 00 3030, dated Aug. 27, 2012.
International Preliminary Report on Patentability for International Patent Application No. PCT/US2011/034564, dated Jul. 25, 2013.

* cited by examiner

KEY DUPLICATION MACHINE

CROSS REFERENCE TO RELATED APPLICATION

This application is a continuation of U.S. patent application Ser. No. 13/015,982 titled "KEY DUPLICATION MACHINE," filed on Jan. 28, 2011 which is a continuation of U.S. patent application Ser. No. 13/006,714 now U.S. Pat. No. 8,128,322, titled "KEY DUPLICATION MACHINE," filed on Jan. 14, 2011, which is a continuation of U.S. patent application Ser. No. 11/656,925, now U.S. Pat. No. 7,891,919, titled "KEY DUPLICATION MACHINE," filed on Jan. 23, 2007, which claims the benefit of U.S. Provisional Patent Application No. 60/761,293, titled "KEY DUPLICATION MACHINE," filed Jan. 23, 2006, each of which are hereby incorporated in their entirety.

FIELD OF INVENTION

This invention relates generally to apparatus and methods for duplicating keys, and more specifically, this invention relates to apparatus and methods for cutting duplicate keys based on a captured image of a master key.

BACKGROUND

Key duplication and key cutting machines are designed to reproduce a key pattern of a master key onto a key blank. Prior art key duplication and key cutting machines typically determine the key pattern of a master key by mechanically engaging the key pattern of a master key with a stylus, tracer bar, or other such mechanical member. For example, prior art key duplication machines typically comprise a pair of clamps or vise grips mounted on a carriage. A master key, having a key pattern, is placed in a first clamp. A key blank, manually selected by the machine operator, is placed in a second clamp, which is normally positioned adjacent to the first clamp. The stylus is placed in contact with the key pattern of the master key. A cutting wheel is placed in contact with an edge of the key blank, into which the key pattern of the master key is to be duplicated. The stylus and cutting wheel are coupled such that the movement of the cutting wheel is synchronized with and controlled by the movement of the stylus.

The carriage is arranged such that the carriage may be moved pivotally and linearly along a longitudinal supporting shaft that is generally parallel to the blades of the master key and key blank. The carriage is typically moved manually along the shaft, causing the stylus to move along the key pattern of the master key. As the stylus moves along the key pattern of the master key to trace the key pattern, the cutting wheel moves along the blade of the key blank. The coupling of the stylus and cutting wheel controls the movement of the cutting wheel and cuts a duplicate key pattern into the key blank. Once the cutting process is completed, the newly duplicated key may be removed from the clamp and buffed on a buffing wheel or swiped across a wire brush to remove any burrs.

In the prior art process described, the key cutting machine operator manually selects the key blank. It is of great importance that the key pattern of a master key be copied onto an appropriate key blank having the same key blade and grooves. There are numerous key blanks, and many are not readily distinguishable from each other. Identifying the correct key blank for use in duplication often requires visually examination of a plurality of key blanks, where differences between key blanks may be very subtle, significantly increasing the level of difficulty in identifying the proper key blank. All too often, businesses that offer key cutting services are not staffed by experienced locksmiths capable of consistently and accurately identifying the proper key blank to be used. Instead, an employee is shown how to "eyeball" what is thought to be the correct blank and then cut a duplicate key at the substantial risk of the key working improperly.

Once a key blank is manually chosen by the operator, that key blank goes through the cutting process. If a mistake is made in the manual selection of a key blank, the entire process of manually identifying the best key blank and mechanically cutting the key must begin again. Often, such errors are not identified until after the customer leaves the store, thus resulting in frustration with the retailer due to an unsuccessful key cut.

Although prior art key duplication machines and processes are well established and widely utilized, such machines and processes produce a relatively high scrap rate, overly rely on the experience and judgment of machine operators, and may not allow for evaluation of the accuracy of a duplicate key without the duplicate key being tested in its associated lock. Due to these and other limitations of the prior art, the art field is constantly striving to improve cut accuracy, cut quality, and ease of use of key duplication machines and processes. Improvements to key duplication machines and processes that enhance the accuracy and quality of a duplicate key or produce more user-friendly machines are well received in the key duplication industry.

A general goal of the industry is to develop key duplication machines and processes that are so user-friendly that a customer or general consumer may duplicate a key with minimal instructions and minimal knowledge of keys. Therefore, improvements in machines and processes for cutting duplicate keys that simplify the cutting process or improve the accuracy of key blank identification are greatly desired. Further, the industry constantly strives for less expensive, easier to assemble, and easier to maintain machines. Should newly developed key duplication machines or processes achieve any of these objectives, it would be a significant improvement over the expensive and often difficult to use key cutting machines currently known in the field.

SUMMARY OF INVENTION

Apparatus, methods, and other embodiments associated with a key duplication machine are described. In one embodiment, an assembly for duplicating a master key includes an optical imaging device, a logic, a clamping assembly, and a cutting member. The optical imaging device is capable of capturing an optical image of at least a portion of the master key. The logic is capable of determining a key pattern of the master key from the optical image of the master key. The clamping assembly is capable of clamping a key blank and the cutting member is capable of cutting a key pattern into said key blank.

In another embodiment, a method for duplicating a master key includes capturing an optical image of at least a portion of the master key; providing a logic to determine a key pattern of the master key from the optical image of the master key; securing a key blank; and cutting a key pattern into the key blank.

DESCRIPTION OF THE DRAWINGS

In the accompanying drawings, which are incorporated in and constitute a part of this specification, embodiments of the invention are illustrated, which, together with a general description of the invention given above, and the detailed description given below serve to illustrate the principles of this invention. The drawings and detailed description are not intended to and do not limit the scope of the invention or the claims in any way. Instead, the drawings and detailed description only describe embodiments of the invention, and other embodiments of the invention not described are encompassed by the claims.

DETAILED DESCRIPTION OF THE INVENTION

Figure 1:
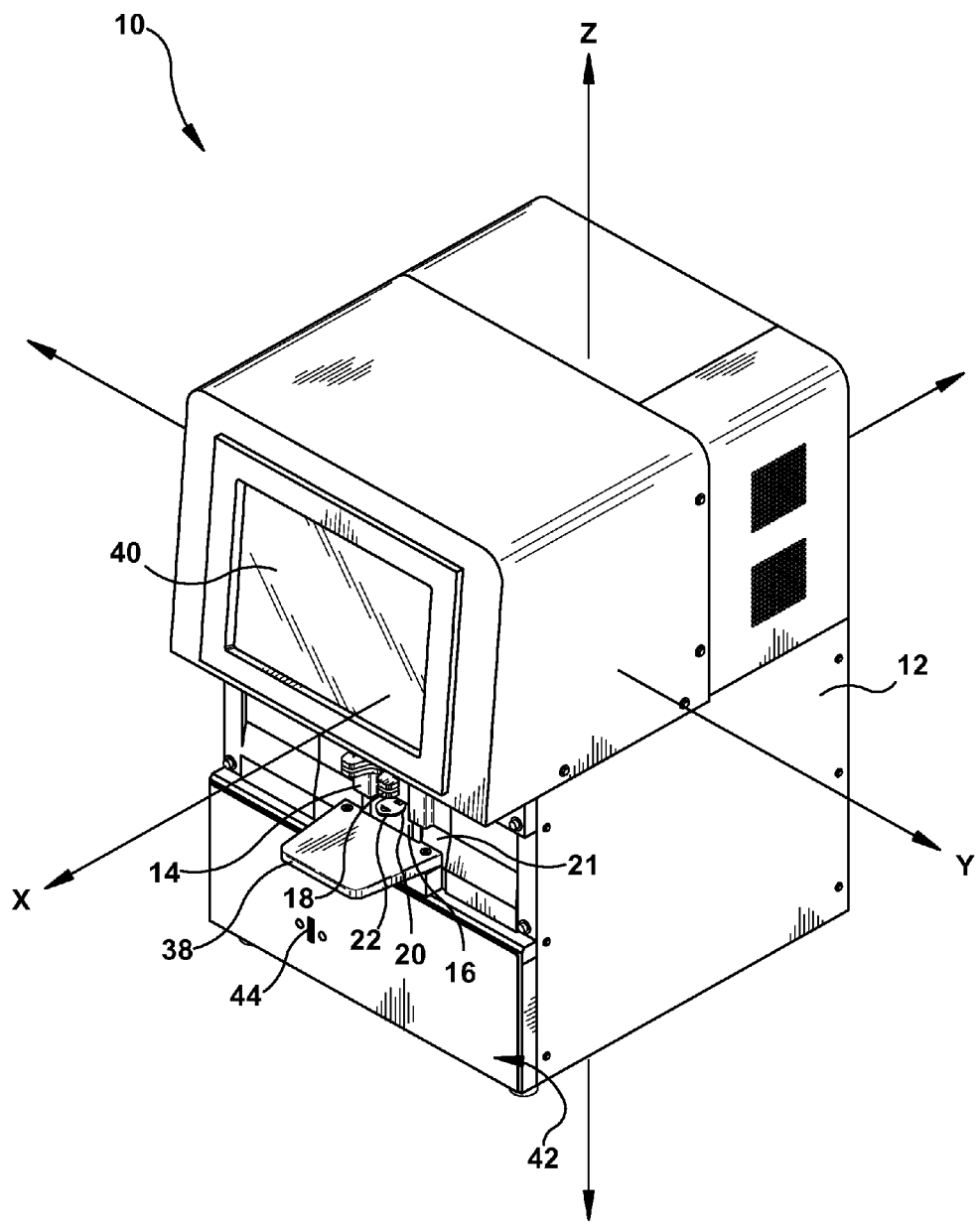
FIG. 1 is perspective view of an exemplary embodiment of a key duplication machine in accordance with the present invention.

The Detailed Description of the Invention merely describes embodiments of the invention and is not intended to limit the scope of the claims in any way. Indeed, the invention as described by the claims is broader than and unlimited by the preferred embodiments, and the terms in the claims have their full ordinary meaning.

As described herein, apparatus and methods can be designed to produce accurate and reliable duplicates of master keys. In one embodiment, the duplication of a master key is facilitated by the capture of an optical image of a profile or silhouette of the master key, including the key pattern of the master key, and the capture of a profile or silhouette of a key blank. As will be further described herein, the captured images may be analyzed by logic to determine the proper key blank to be used for a duplicate key, validate the selection of the proper key blank, facilitate the accurate cutting of the key pattern of the master key into the key blank, and validate the accuracy of the key pattern cut into the key blank. The apparatus and methods may further facilitate the cutting of a substantial variety of key types, such as single-sided keys, double-sided keys, sidewinder keys, house keys, automobile keys, commercial keys, and the like. The analysis of images by logic may include, for example, the logic storing images, storing data, quantifying physical measurements based on the image, retrieving referencing data contained in a database, and the like.

As used herein, the term "logic" includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like an application specific integrated circuit (ASIC), an analog circuit, a digital circuit, a programmed logic device, a memory device containing instructions, or the like. Logic may include one or more gates, combinations of gates, or other circuit components. Logic may also be fully embodied as software. Where multiple logical logics are described, it may be possible to incorporate the multiple logical logics into one physical logic. Similarly, where a single logical logic is described, it may be possible to distribute that single logical logic between multiple physical logics. In addition, as used herein, the term "database" includes a physical and/or logical entity that can store data. A database may be, for example, a traditional database, a table, a file, a list, a queue, a heap, a memory, a register, and so on. A database may reside in one logical and/or physical entity and/or may be distributed between two or more logical and/or physical entities.

Optionally, the apparatus and methods described herein may accept input from a user or operator of a key duplication machine and may provide output to the user or operator of the machine to further facilitate key duplication. For example, the apparatus may include a user interface, such as monitor, touch screen, or other such device, through which a user may enter information and information may be displayed to the user.

In an embodiment, a method of using the key duplication machine comprises the steps of inserting a master key into the machine such that the blade of the master key is within an imaging zone of the machine; capturing an image of the key pattern of the master key; utilizing logic to analyze the captured image; comparing the captured image with data on key blanks contained in a database; determining the proper key blank for duplicating the master key; outputting information regarding the proper key blank to the user; removing the master key from the machine; retrieving and inserting the proper key blank into the machine such that the blade of the key blank is within the imaging zone of the machine;

capturing an image of the key blank; using logic to analyze the image of the key blank and validating that the key blank is proper; aligning the key blank; moving the key blank to a cutting zone of the machine; cutting the key pattern of the master key into the key blank; moving the newly-cut duplicate key to the imaging zone of the machine; capturing an image of the duplicate key; using logic to analyze the image of the duplicate key; compare the analysis of the image of the master key with the analysis of the image of the duplicate key to validate the accuracy of the key pattern cut into the duplicate key; removing the duplicate key from the machine; and de-burring the duplicate key.

An exemplary embodiment of a key duplication machine 10 is illustrated in the accompanying Figures. The key duplication machine 10 as described herein has numerous features or improvements, each of which are believed to be independently novel. Therefore, while embodiments of the present invention are described as utilizing each of these novel features or improvements in the aggregate, nothing in the present description should be interpreted as requiring an embodiment to include or exclude any of the particular improvements described herein. In addition, the key duplication machine 10 described herein incorporates a key blank identification system and a key cutting system into a single apparatus. However, it should be understood that either system could be used individually or used together. Nothing in this description should be interpreted to limit novel features of each individual system as used alone or in an integrated unit. Therefore, as described herein as an integrated system, a master key is imaged and compared with other key blanks to determine the appropriate key blank to be used, while also utilizing the master key image to provide key pattern information to be cut into the key blank.

Figure 4B:
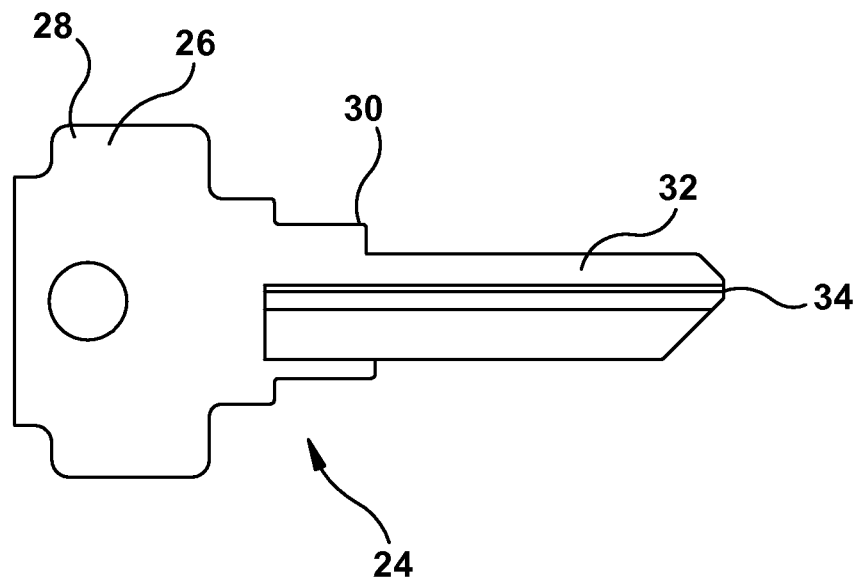
FIG. 4B is a plan view of a key blank.
Figure 4A:
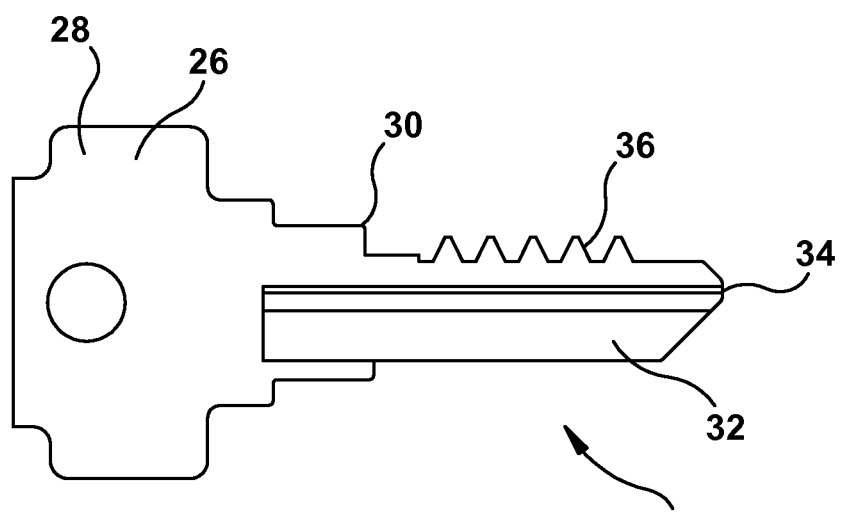
FIG. 4A is a plan view of a master key.

FIGS. 4A and 4B illustrate a common master key 22 and key blank 24. While it is known that numerous types of keys are used in the key industry, for simplicity the master key 22 illustrated in FIG. 4A is an exemplary house key, and the key blank 22 illustrated in FIG. 4B is a exemplary key blank 24 for the house key 22. Both the master key 22 and key blank 24 typically include a head 26 having a bow 28, a shoulder 30, a blade 32, and a keyway groove 34. The keyway groove 34 is typically a narrow, milled-out area along the length of the blade 32 that allows the blade 32 to bypass the wards in a keyway. Such keyway grooves 34 may already be cut into the key blank 24 to simplify the key cutting operation. Therefore, when duplicating a master key 22, a key blank 24 must include a keyway groove 34 that is either identical to or similar to the master key 22. The master key 22 includes a key pattern 36, which is a model for any key pattern cut into the key blank 24 in duplicating the master key 22. As used herein, master key refers to any key that has a key pattern, whether an original key purchased with a lock and fabricated by the manufacturer of the lock or a subsequent duplication of the original key. The reference to a key as a master key indicates that the key serves as a model from which to cut a duplicate key to perform the same unlocking function as the master key.

Figure 2:
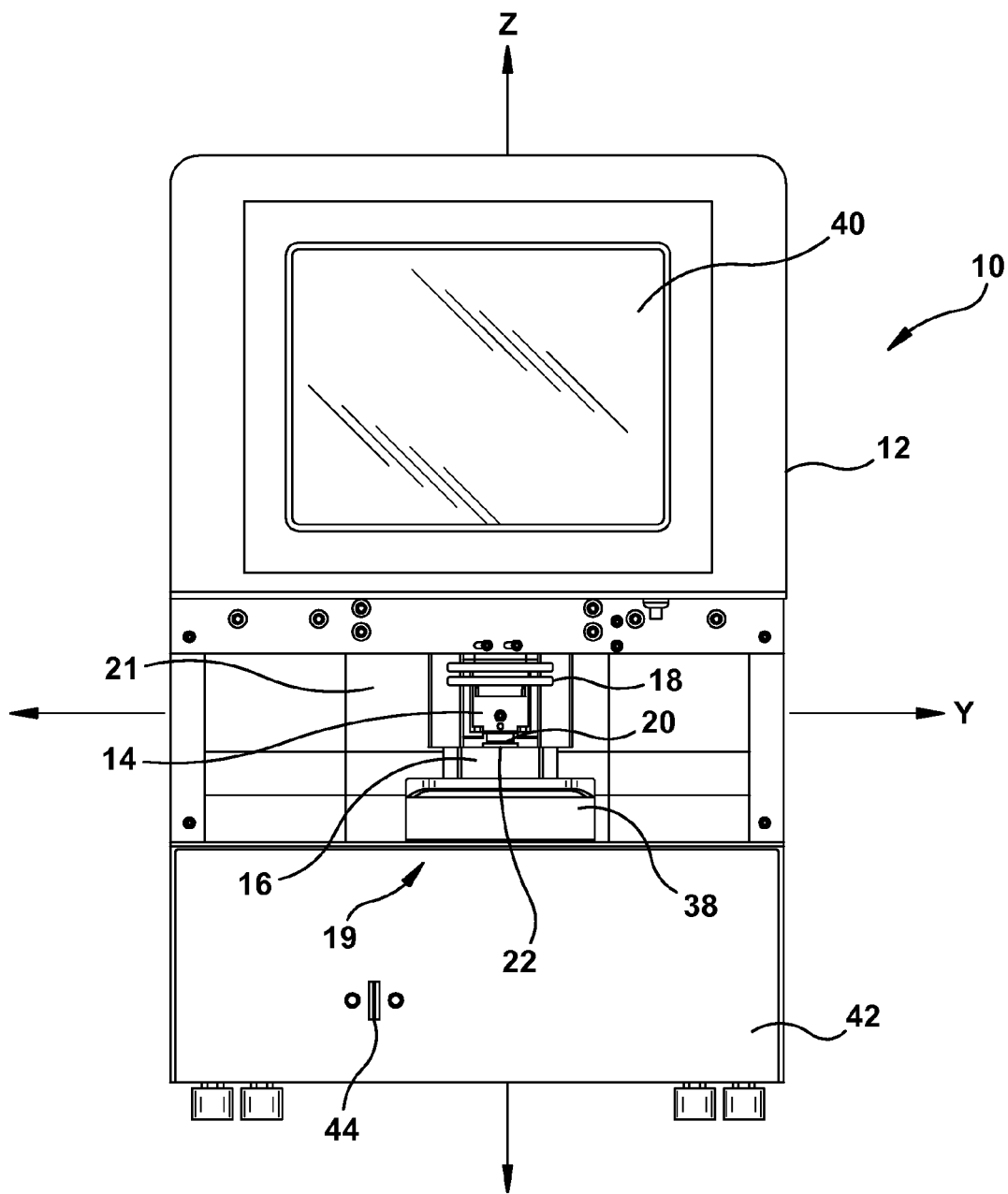
FIG. 2 is a front view of the key duplication machine of FIG. 1.
Figure 3:
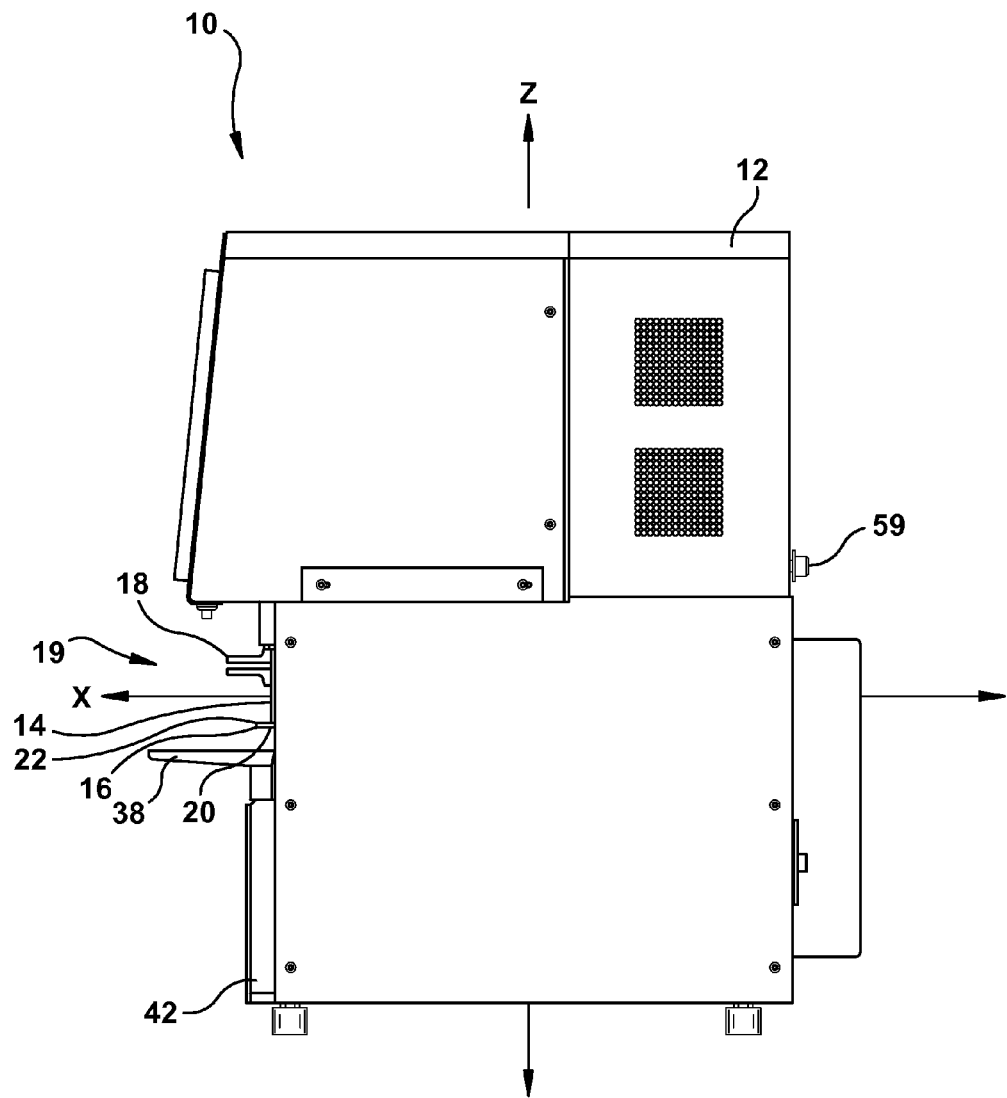
FIG. 3 is a side view of the key duplication machine of FIG. 1.

With reference to FIGS. 1 through 3, an assembled key duplication machine 10 is illustrated. The machine 10 includes an outer shell 12, comprising a number of panels arranged to enclose and protect internal components, mechanisms, and systems of the key duplication machine 10. The machine 10 further includes a door clamp 14, which is biased against a base 16 with a biasing member (not shown). The door clamp 14 may be biased against the base 16 by any biasing member such as, for example, an extension or compression coil spring, a torsion spring, a counterweight, or the like. The door clamp 14 may be raised against the biasing force by a handle 18.

Figure 5:
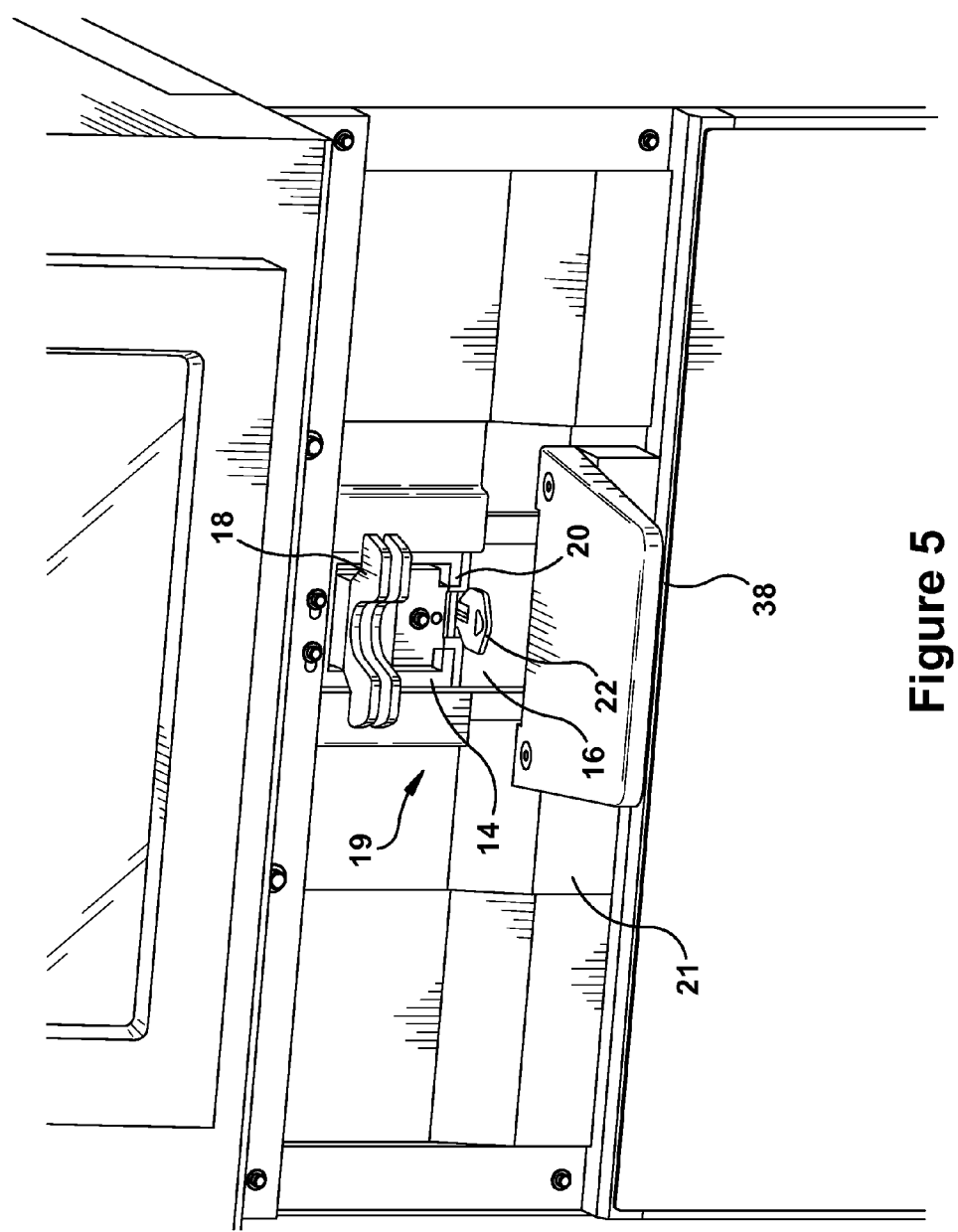
FIG. 5 is a perspective view of a key secured in the slot of the key duplication machine of FIG. 1.

The combination of the door clamp 14, base 16, handle 18, and biasing member forms a retention mechanism 19 for retaining or securing a master key 22 or key blank 24. As illustrated in FIG. 5, the door clamp 14 and the base 16 form a slot 20 that may be utilized to retain or secure a master key 22 or key blank 24 such that the blade 32 of the key 22 and 24 is located within the machine 10. The force placed on the key 22 and 24 in the slot 20 is sufficient to retain or hold the key 22 and 24 in place but also allows some movement of the key 22 and 24 to facilitate proper alignment of the key 22 and 24.

As will be further described, the blade 32 of a key 22 and 24 may be positioned within the machine 10 such that an image of the blade 32 may be captured. In addition, the blade 32 of a key blank 24 may be positioned within the machine 10 such that the blade 32 is exposed to clamps and cutters. The clamps are arranged to selectively rigidly secure the key blank 24, and the cutters are arranged to selectively cut a key pattern into the blade 32 of the key blank 24 when the key blank 24 is rigidly secured in the clamps.

In an embodiment, the key 22 and 24 may be positioned with a first side of the blade 32 facing upward, or the key 22 and 24 may be rotated 180 degrees and positioned with the first surface of the blade 32 positioned downward. As will be further described, in such an embodiment, such variable orientation or registration of the key 22 and 24 does not affect the subsequent imaging, positioning or cutting of a key 22 and 24. The key duplication machine 10 may be arranged such that logic used to analyze images and control the movement, alignment, and cutting of keys 22 and 24 may detect the orientation or registration of the key 22 and 24 and account for such orientation or registration during the duplication of a master key 22 so that the proper key cuts are made regardless of the positioning of the key blank 24 so as to promote user friendliness and speed of duplication.

The door clamp 14, base 16, handle 18, and slot 20 are located on a retention mechanism panel 21. The panel 21 is arranged such that the panel 21 may slide to the left and right, with respect to FIG. 2. As will be further described, such movement allows the machine 10 to move the blade 32 of a key blank 24 between an imaging zone, where an image of the blade 32 may be captured, and a cutting zone, where a key pattern 36 may be cut into a key blank 24.

The key duplication machine 10 includes a table 38 located below the slot 20. The table 38 is positioned such that when a master key 22 is secured in the slot 20, the table 38 holds additional keys on a key ring so that the user does not have to remove the master key 22 from its key ring for the purposes of duplication. A touch-screen monitor 40 is incorporated into the machine 10, through which a user may enter information and information may be displayed to the user. In addition, a metal shavings drawer 42 is provided beneath the internal key cutting mechanisms to catch metal shavings generated during the cutting of keys. The shavings drawer 42 may be removed from the machine 10 to facilitate the disposal of collected shavings. For convenience, a de-burring slot 44 is provided. The slot 44 leads to a burr-cleaning member such as a wheel, square brush, or the like, to clean and de-burr newly cut keys.

Optionally, a vacuum system (not shown) may be incorporated into the machine 10 to capture key cutting shavings as they are generated and to assist in cleaning the work area after key cutting operations. Such a vacuum system may be attached to the machine 10 in the vicinity of the cutting operation or in or near a catch basin. Such an exemplary system is described in U.S. patent application Ser. No. 10/970,844, titled KEY CUTTING MACHINE, filed on Oct. 20, 2004, and commonly owned by the present assignee. The Ser. No. 10/970,844 patent application is hereby expressly incorporated by reference in its entirety. The Ser. No. 10/970,844 application describes a removable vacuum tube capable of capturing key cutting shavings and assisting in cleaning the work area after the key cutting operation. It will be clear to those skilled in the art that such a vacuum system could be incorporated into the present apparatus and attached in the vicinity of the cutting operation or in or near the catch basin.

As will be further described, during the process of duplicating or cutting a key, internal components, mechanisms, and systems of the key duplication machine 10 experience motion and movement relative to other components of the machine 10. To facilitate the description of such motion and movements, reference will be made to movements relative to an X-axis, Y-axis, and Z-axis. The orientations of these axes are shown in FIGS. 1 through 3. When motion or movement is described herein as "moving along the X-axis," for example, this description includes motion along any axis parallel to the X-axis shown in FIGS. 1 through 3. Movements along the X-axis are generally between the front and back of the machine 10, movements along the Y-axis are generally between the left side and right side of the machine 10, and movements along the Z-axis are generally between the top and bottom of the machine 10. As will be understood by those skilled in the art, descriptions of motion or movement along an axis are not intended to be exactly and precisely along or parallel to such an axis. Movement and motion that is approximately or roughly along an axis or parallel to an axis are included in the description of motion or movement along an axis. The use of "along an axis" or "about an axis" are intended to simplify a general description of the apparatus and methods described herein and not intended to limit the scope or understanding of such apparatus and methods.

Figure 6:
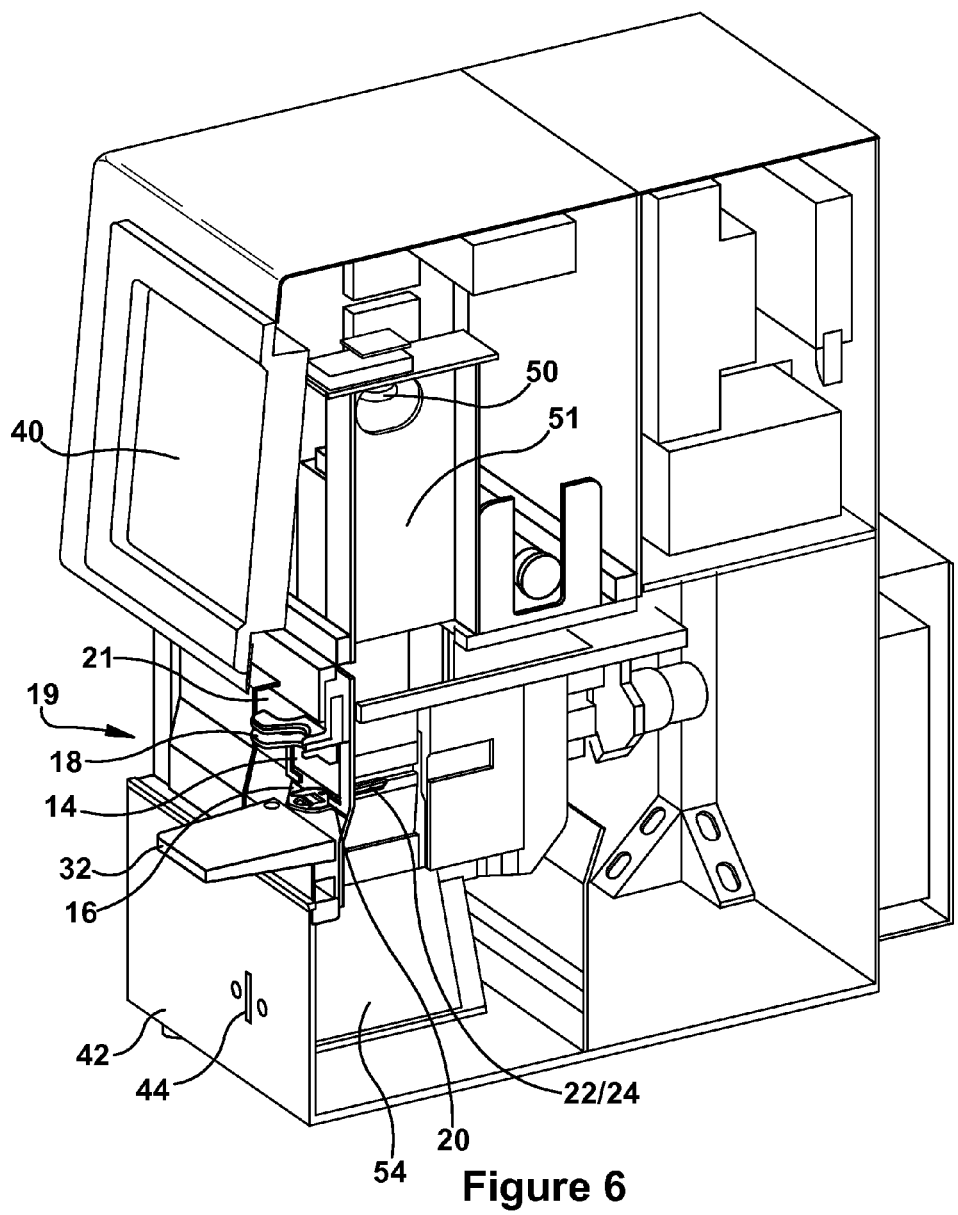
FIG. 6 is a partial perspective view of the interior of the key duplication machine of FIG. 1.

FIGS. 6 though 21 illustrate exemplary internal components, mechanisms, and systems of the key duplication machine 10 and will be referenced in describing methods for using the machine 10 to form duplicate keys from master keys 22.

Referring again to FIG. 5, a master key 22 or key blank 24 may be placed and retained in the slot 20 in the retention mechanism panel 21 such that the blade 32 is positioned within the machine 10 and in the imaging zone. As best seen in FIG. 6, an optical imaging device 50 is mounted within the machine 10 and positioned such that it captures an optical image of a key 22 and 24 secured in the slot 20. The image of the key 22 and 24 may generally include the blade 32 of the key 22 and 24, the key shoulder 30, and at least a portion of the head 26. As generally used herein, the imaging area is an area that is below (along the Z-axis) the optical imaging device 50. The optical imaging device 50 is generally positioned above the key 22 and 24 and directed downward such that a silhouette of the key 22 and 24, including the blade 32 of the key 22 and 24, may be captured.

In one embodiment, the optical imaging device 50 is a camera, and the image captured is a photographic image. In an embodiment, the camera 50 is a digital camera, and the image captured is a digital image. A digital image may be stored in file form or in data form and may be analyzed by logic. As best seen in FIG. 6, a tube 51 (shown in cross-section) may extend downward from the imaging device 50 towards the key 22 and 24. Such a tube 51 may facilitate the channeling of light to the camera and result in a high quality captured image.

Figure 7:
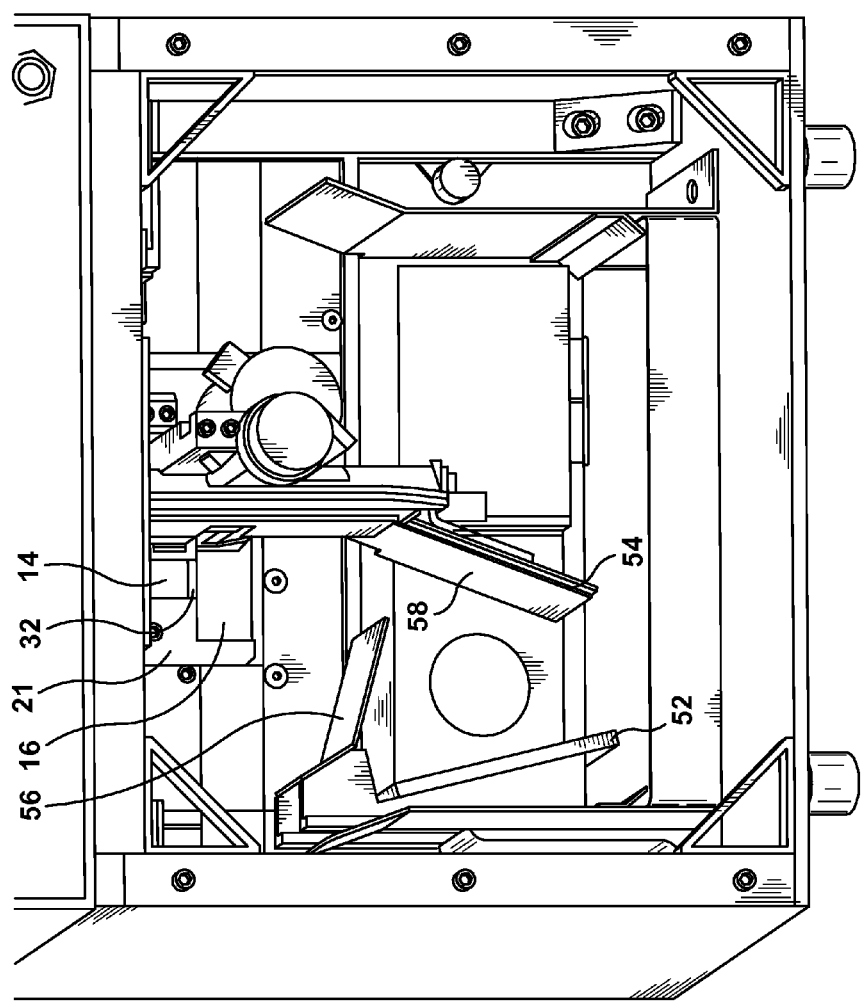
FIG. 7 is a partial perspective view of the interior of the key duplication machine of FIG. 1.

To enhance an image captured by the optical imaging device 50, the machine 10 includes a system for providing backlighting to the key 22 and 24. As best seen in FIG. 7, a lighting panel 52, reflector plate 54, and a blocking plate 56 cooperate to provide backlighting to the key 22 and 24. The lighting panel 52 emits light, which is reflected off the reflector plate 54 and directed towards the key 22 and 24. A surface 58 of the reflector plate 54 is coated or otherwise treated to disperse and diffuse light emitting from the lighting panel 52. This dispersion and diffusion of light creates a backlighting environment that enhances captured images of the key 22 and 24. The coating or treatment of the surface 58 of the reflector panel 54 may be any coating or treatment that sufficiently disperses and diffuses light. For example, the surface 58 may be coated with a gritty substance, such as sandpaper; the surface 58 may be painted; the surface 58 may be machined or otherwise treated to roughen the surface 58; or the surface 58 may include a pattern that disperses and diffuses light. The reflector plate 54 may be arranged at a relatively steep angle, as best seen in FIG. 7, to decrease the likelihood that shavings from the cutting of keys may fall onto and stick to the surface 58 of the reflector plate 54. Such an angle makes it likely that shavings falling onto the surface 58 will slide off the surface 58 and settle into the shavings drawer 42. In an embodiment, any treatment or coating applied to the surface 58 of the reflector plate 54 is selected to match the color and reflectivity of any buildup of dust that may accumulate onto the surface 58 due to the cutting of keys above the reflection plate 54.

The lighting panel 52 may include any type of light-emitting devices such as, for example, light bulbs, light emitting diodes (LED), liquid crystal displays (LCD), and the like. In an embodiment, the light panel 52 comprises a matrix of evenly spaced LEDs. Alternatively, LEDs may be unevenly spaced so as to create more favorable light dispersion and diffusion. In an embodiment, the light emitted from the lighting panel 52 may be in the red spectrum, which may, under certain circumstances, create crisper images of a key silhouette. As will be understood by those skilled in the art, other types of backlighting systems may include directing light on the shavings or an object in the shavings drawer 42. Any particular configuration that provides well-dispersed and diffused light appropriate for backlighting is contemplated and incorporated herein. Alternatively, front lighting or providing light directly to the key 22 and 24 may also be used when capturing an image of the key 22 and 24.

The logic may be arranged to analyze the backlighting and the resulting quality of a captured image. Based on such analysis, the backlighting may be adjusted, such as in direction or in intensity, to improve subsequent captured images. In addition, the positioning of the lighting panel 52, reflector plate 54, and a blocking plate 56 may also be adjusted to improve subsequent captured images.

The apparatus as described may be utilized to capture the image of the blade 32 of a master key 22, including the key pattern 36. Such a captured image may be analyzed by logic to quantify and specifically define the key pattern 36 of the master key. Such analysis may include quantifying and defining the depth, angle, and position of each tooth in the key pattern 36; determining whether there is a key pattern 36 on one side of the key 22 (a single-sided key) or on both sides of the key 22 (a double-sided key); determining precisely where along the blade 32 the key pattern 36 begins and ends; and the like. In addition, surface features of the blade 32, such as the presence, length, and width of a key groove 34, may be determined. In one embodiment, surface features of the blade 32 may be determined by positioning the optical imaging device 50 to an angle with respect to the surface of the blade 32. As will be further described, such information may be stored by the logic for subsequent use in selecting a key blank 24, precisely cutting a key pattern into a key blank 24 and in comparing the key pattern cut into the key blank 24 and the key pattern 36 of the master key 22.

The captured image of the blade 32 of the master key 22 may also be used to specifically determine the proper key blank 24 to use when duplicating the master key 22. The captured image may be analyzed using logic to quantify and specifically define features of the master key blade 32 such as, for example, the size and shape of the shoulder 30, the length and width of the blade 32, whether the master key 22 is single-sided or double-sided, whether the blade 32 includes any steps or grooves, and the like. To facilitate the identification of a proper key blank 24, the logic may compare the quantified and defined features of the master key 22 with data in a database regarding known key blanks 24. Such a database may include data on the physical dimensions of known key blanks 24, and the logic may make direct comparisons between physical dimensions of known key blanks 24 and the features of the master key 22 as determined from the captured image. Such comparisons may lead to the determination and selection of the proper key blank 24 for the master key 22.

Optionally, additional imaging of the master key 22 may be performed to determine or quantify surface features of the master key 22 such as, for example, the keyway groove 34. Such surface features may assist in narrowing or choosing the proper key blank 24. Such imaging may be performed by providing a ring of structured light about the key blade 32 and an optical imaging device to record a tip view or cross-sectional view of the key 24, performing a laser scan across the key blade 32 to identify the width and spacing of a keyway groove 34, or projecting a shadow across the surface of the blade 32 to measure the variations in shadow contour related to surface area contour.

With regard to a laser scan of the key blade 32, a dot scan may be utilized using a single laser dot that may be moved continuously along a path, projected at certain points along a path, or utilized with multiple laser dot scans in numerous types of configurations to acquire the necessary information. It should be clear that such a scan could read one or both sides of a key 22. Information on the groove 34 may likewise be analyzed and compared by the logic to groove information stored in the database related to known key blanks 24. Therefore, based upon the master key 24 silhouette and, optionally, the key groove 34 features, the logic may identify a single key blank 24 for use in duplicating the master key 24.

Once the proper key blank 24 is identified, the key duplication machine 10 may direct output information to the user to indicate which specific key blank 24 is identified. In one embodiment, such information may be displayed on the touch-screen monitor 40. The user may then retrieve the proper key blank 24 from a retail display based on the displayed information. In an embodiment, various key blanks 24 may be displayed on a display or retail rack with light indicators positioned near each type of key blank 24. Once the proper key blank 24 is identified, the machine 10 may send a signal to the display rack and the display rack may illuminate the light indicator associated with the proper key blank 24. Such a system directs the user to the proper key blank 24 and reduces user error in selecting a key blank 24. The machine 10 may include a display connection 59 (as seen in FIG. 3) to connect the machine 10 to the display rack, through which a signal may be sent from the display rack from the machine 10. Optionally, the machine 10 and display rack may be integrated or the machine 10 and rack may be arranged to send and receive signals remotely, wirelessly, etc. Such apparatus and methods are described in U.S. patent application Ser. No. 10/633,933, filed on Aug. 4, 2003, and titled OBJECT IDENTIFICATION SYSTEM. The Ser. No. 10/633,933 application may be incorporated or otherwise utilized with embodiments described herein. The Ser. No. 10/633,933 application is commonly owned by the present assignee and hereby expressly incorporated herein by reference in its entirety.

Once the proper key blank 24 is identified and retrieved by the user, the user may remove the master key 24 from the slot 20 in the retention mechanism panel 21 and place the key blank 24 in the slot 20. When the key blank 24 is placed into the slot 20, the key blank 24 may be validated to insure that the proper key blank was retrieved by the user, internal mechanisms may align the key blank 24, the key blank 24 may be further secured or clamped, and a key pattern may be cut into the key blank 24 to duplicate the maser key 22. As previously described, the orientation or registration at which the user inserts the key blank 24 in the slot 21 does not affect the subsequent operations on the key blank 24. The logic may analyze captured images of the inserted blank 24 to determine the orientation and adjust all subsequent operations accordingly.

Figure 8:
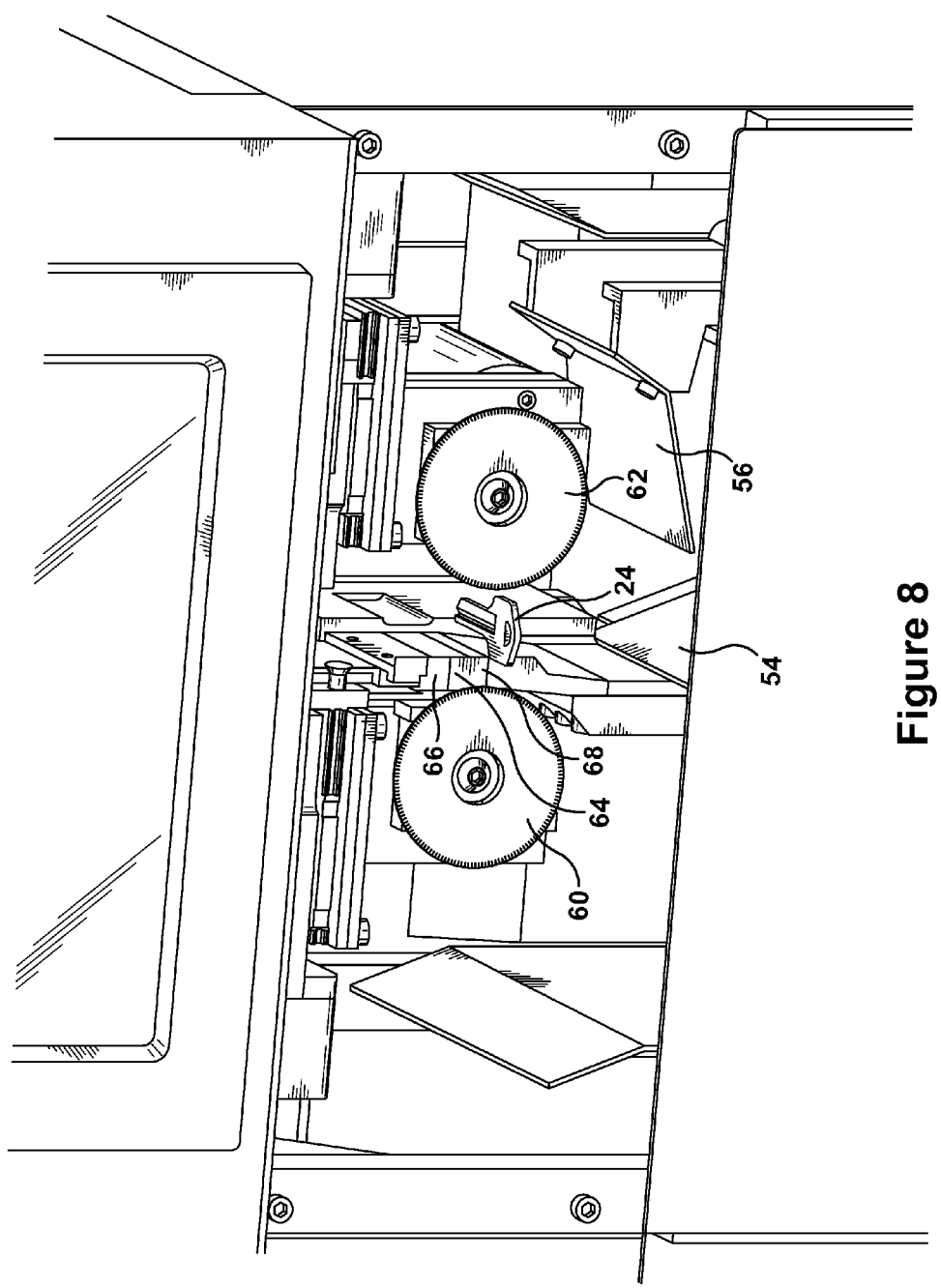
FIG. 8 is a partial perspective view of the interior of the key duplication machine of FIG. 1.
Figure 9:
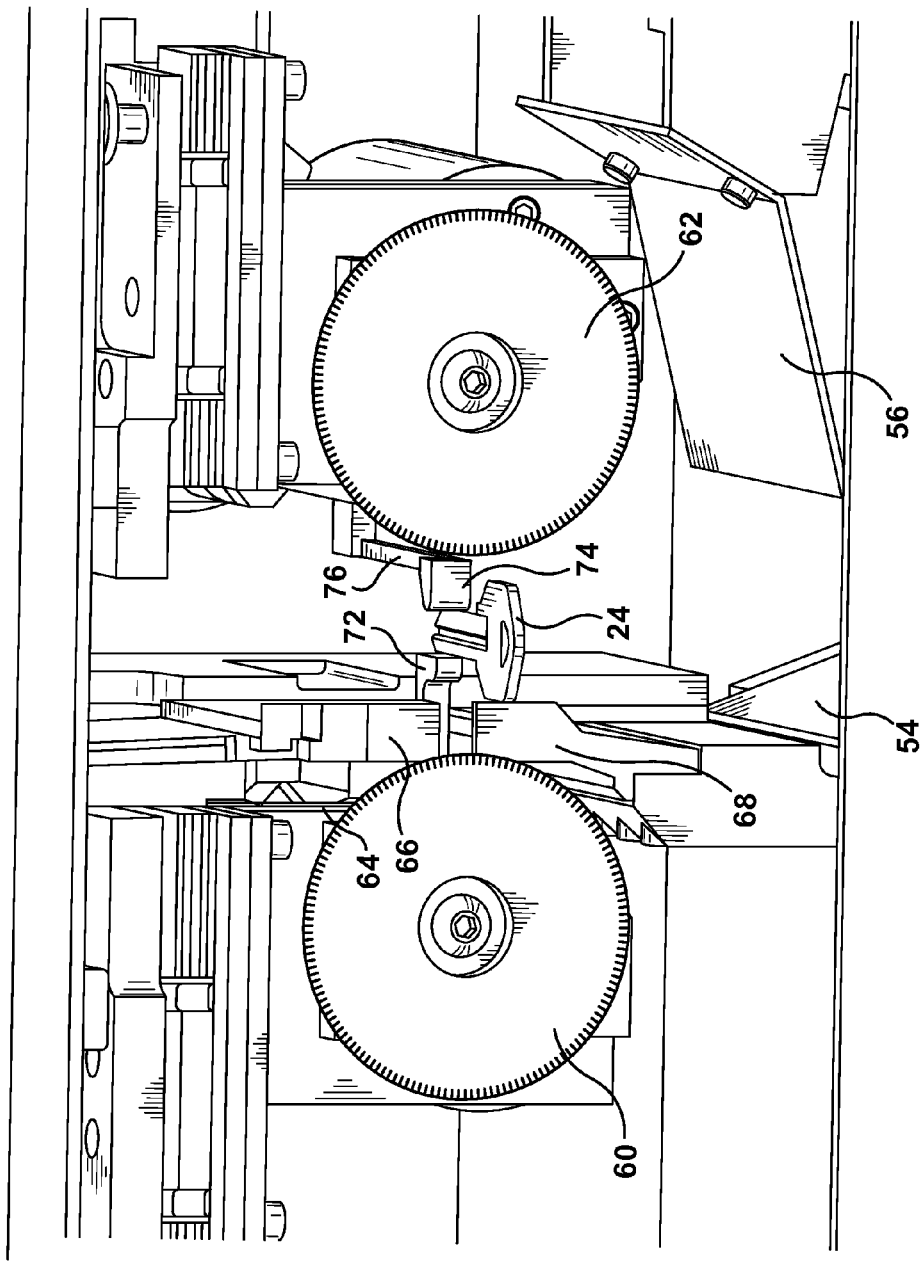
FIG. 9 is a partial perspective view of the interior of the key duplication machine of FIG. 1.

FIGS. 8 and 9 illustrate the positioning of a key blank 24 relative to internal components, mechanisms, and systems as it is initially inserted and secured in the slot 20. In this initial position, the key blank 24 is in the imaging zone. The retention mechanism panel 21 is not shown in FIGS. 8 and 9 for clarity. As shown in FIG. 8, a left cutting wheel 60 is positioned to the left of the key blank 24 and a right cutting wheel 62 is positioned to the right of the key blank 24 as viewed from the front of the machine 10. A clamping assembly 64, including a top clamp member 66 and a bottom clamp member 68, is located to the left of the key blank 24 as viewed from the front of the machine 10. The clamping assembly 64 is used to clamp the key blank 24 during cutting, the left cutting wheel 60 is utilized to cut the left side of the key blank 24, and the right cutting wheel 62 is utilized to cut the right side of the key blank 24.

The logic may validate that the key blank 24 selected by the user and positioned in the machine 10 is the proper key blank 24, as previously identified. An image of the key blank 24 may be captured by the optical imaging device 50, and logic may be used to analyze the image. Such analysis may determine or quantify features of the key blank 24 such as, for example, the size and shape of the shoulder 30, the length and width of the blade 32, whether the blank 24 is designed as a single-sided or double-sided key, whether the blade 32 includes any steps, and the like. Such determined features may be compared to data regarding features of the previously-identified proper key blank 24 stored in the database. Provided the determined features of the user-selected key blank 24 and the stored features of the previously-identified proper key blank are in agreement, the logic may determine that the proper key blank 24 was selected and positioned by the user. The user may be informed that the user-selected blank 24 is proper, and the duplication process may continue. If the determined features of the user-selected key blank 24 and stored features of the proper key blank are in not in agreement, the logic may inform the user that an improper key blank was selected and instruct the user to reselect a key blank 24 for duplication of the master key 22. Optionally, the duplication process may be halted until the user positions a proper key blank 24, or the machine 10 may incorporate an override function to allow a key pattern to be cut into the selected key blank 24.

Figure 10:
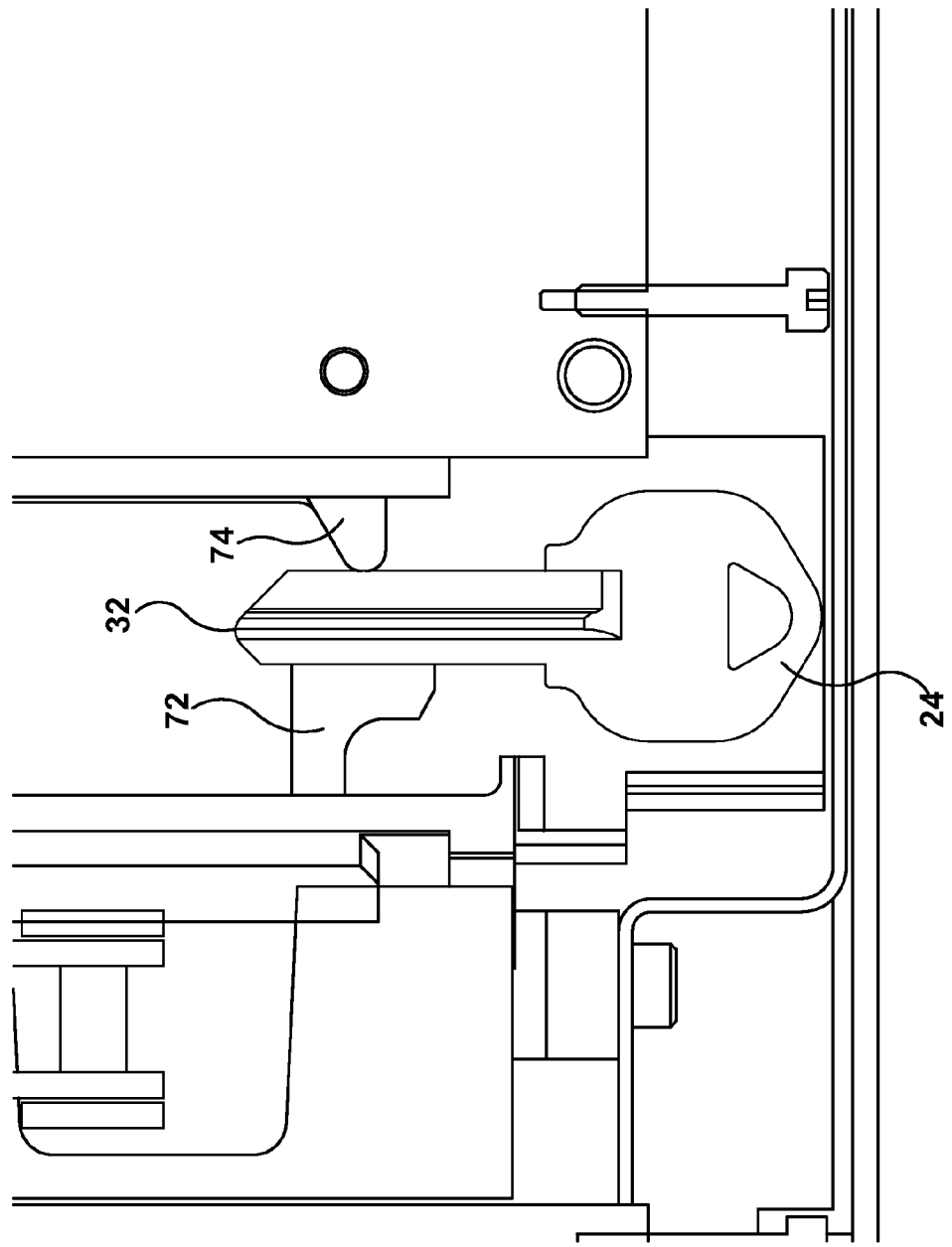
FIG. 10 is a plan view of a key blank positioned between positioner fingers of the key duplication machine of FIG. 1.

Prior to clamping the key blank 24 in the clamping assembly 64, the key blank 24 may be aligned to insure a key pattern is properly cut into the blank 24. The position of the key blank 24, as initially manually positioned by the user, may be determined from the captured image of the blank 24. This image is analyzed by logic and compared to the ideal position for cutting the blank 24, and the positioning of the blank 24 is adjusted to conform to the ideal cutting position. As best shown in FIGS. 9 and 10, a pair of key positioner fingers 72 and 74 engages the key blank 24 to align the blank 24. The left positioner finger 72 engages the left side of the blade 32, and the right positioner finger 74 engages the right side of the blade 24. This engagement squares the key blank 24 with respect to the X-axis and Y-axis to correct for a user having placed the blank 24 into the slot 20 at an angle. The engagement of the fingers 72 and 74 may also properly position the blade 32 along the X-axis. If the user did not insert the blank 24 far enough into the slot 20, the fingers 72 and 74 may move the blade 32 along the X-axis to the proper position. As previously described, the retention mechanism 19 secures a blank key 24; however, the force applied to a key 22 and 24 by the door clamp 14 and base 16 allows the key 22 and 24 to be adjusted relative to the machine 10.

Figure 11:
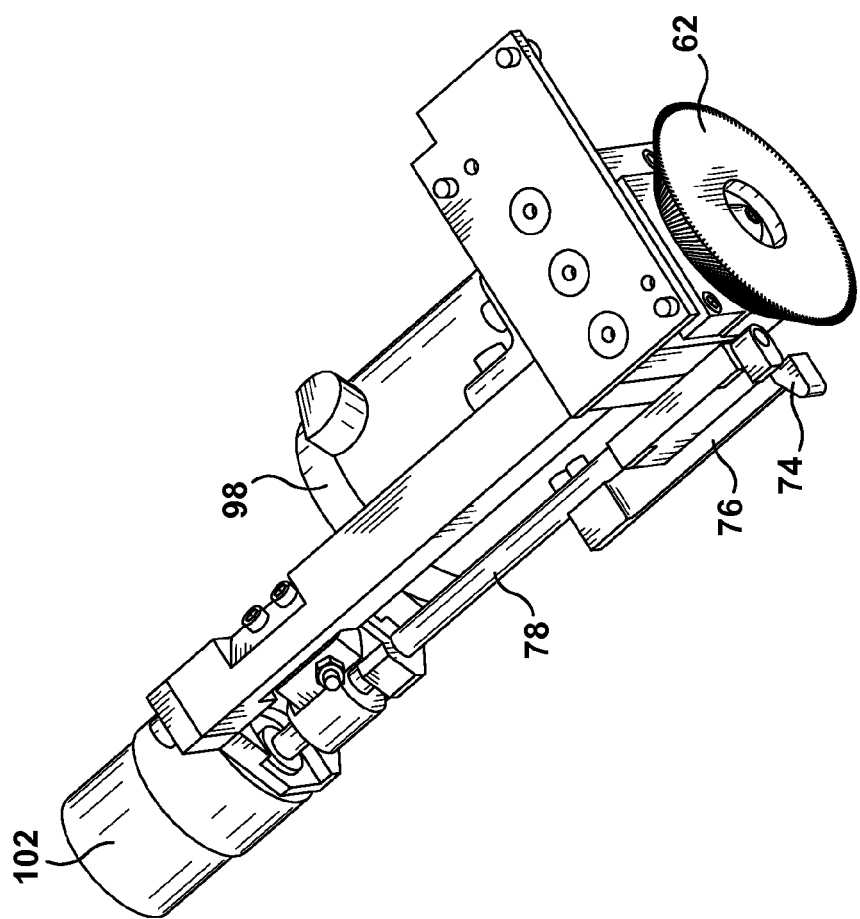
FIG. 11 is a perspective view of a cutting wheel and positioner finger of the key duplication machine of FIG. 1.

The left positioner finger 72 is generally fixed with respect to the blank 24. This is to say that forces between the blank 24 and the left positioner finger 72 do not cause the left positioner finger 72 to deflect. The right positioner finger 74, however, is designed to deflect slightly upon engagement with the blank 24. The right positioner finger 74 includes a cantilever arm 76 that deflects due to forces between the right positioner finger 74 and the blank 24. Such deflection insures that sufficient force is applied to the blank 24 by the fingers 72 and 74 to grip and align the blank 24. When the fingers 72 and 74 are not needed, they may be rotated upwards and out of the way. As best shown in FIG. 11, the right positioner finger 74 is mounted onto a shaft 78. The shaft 78 is arranged to rotate about the X-axis to rotate the finger 74 upward and downward as needed. A similar arrangement rotates the left positioner finger 72 upward and downward.

Once the positioner fingers 72 and 74 have corrected the alignment of the blank 24 based on the analysis of the initial captured image, yet another image of the blank 24 may be captured to validate that the alignment is now proper. In addition to validating the alignment of the blank 24, this captured image may be utilized to record reference points along the blade 32 such as the location of the key shoulder 30, the location of the tip of the blade 32, and the like. As will be further described, the logic may use such reference points, along with the determination of the orientation of the key blank 24, to guide the cutting wheels 60 and 62 during the cutting process.

Although the alignment of a key is generally described with reference to the alignment of a key blank 24 upon the insertion of the blank 24 into the slot 20, it will be readily understood by those skilled in the art that the positioner fingers 72 and 74 may be used, for example, to align a master key 22 prior to capturing an image of the key 22 to be analyzed by the logic.

As shown in FIG. 9, once the blank 24 is properly aligned, the clamping assembly 64 may be opened to accommodate the clamping of the blank 24. In an embodiment, the default position of the clamp assembly is open, and the clamp is closed only when clamping a key blank 24. The bottom clamp member 68 is generally fixed, and the top clamp member 66 is arranged to move along the Z-axis. When the clamping assembly 64 is opened, the blank 24 is moved to the left along the Y-axis until the blank 24 is positioned between the top member 66 and bottom member 68 clamps. The blank 24 is moved along the X-axis to a specific clamping position relative to the clamping assembly 64 as determined by the logic for the specific key blank 24. The logic may specifically position the blank 24 relative to the clamping assembly 64 such that both edges of a blade 32 of a key blank 24 remain exposed for the cutting of a key pattern into both edges of the blade 32. Such an arrangement is common for double-sided key blanks.

Figure 12:
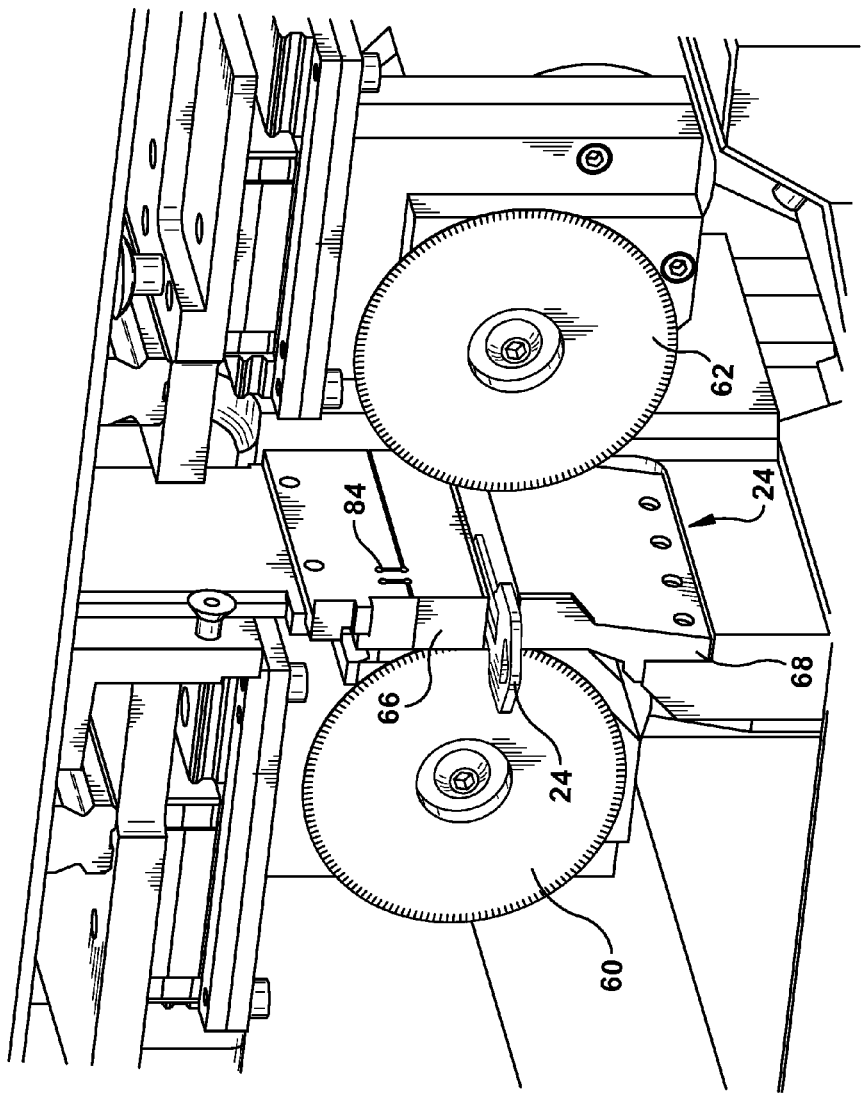
FIG. 12 is a partial perspective view of the interior of the key duplication machine of FIG. 1.

Such movement of the key blank 24 moves the blank 24 from the imaging zone to the cutting zone. The clamp assembly 64 is generally fixed with respect to the Y-axis and generally defines the cutting zone. The blank 24 is moved along the Y-axis by the synchronized movement of the left 72 and right 74 positioner fingers and the retention mechanism panel 21, which includes the slot 20. As seen in FIG. 12, once the blank 24 is positioned between the top 66 and bottom 68 clamp members, the top clamp member 66 is moved downward along the Z-axis to secure the blank 24 in the clamp assembly 64. Once the blank 24 is secured in the clamp assembly 64, the positioner fingers 72 and 74 are rotated upward about the X-axis and out of engagement with the blank 24. Such movement of the fingers 72 and 74 ensures that the cutting wheels 60 and 62 have access to the full length of the blade 32 and both edges of the blade 32.

Figure 13:
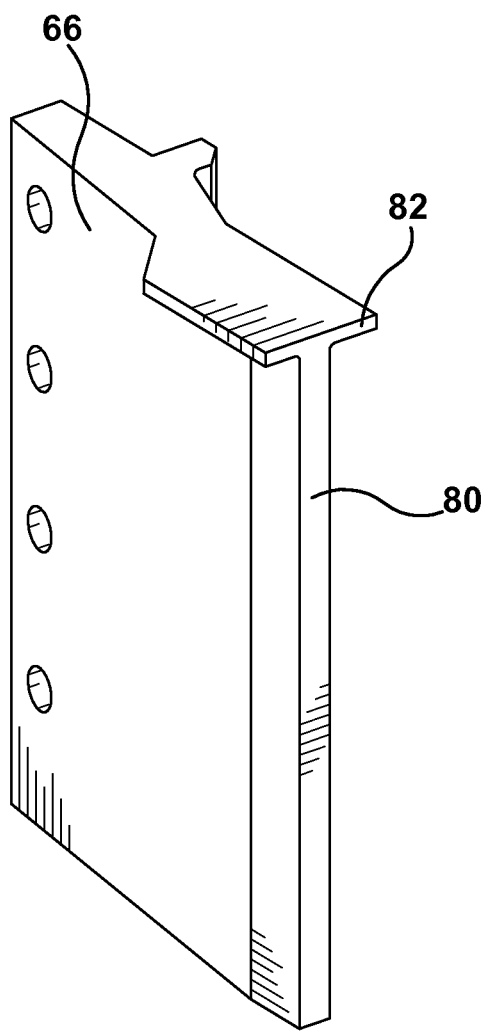
FIG. 13 is a perspective view of a top clamp member of the key duplication machine of FIG. 1.

With reference to FIG. 13, the clamping surface of the clamp members 66 and 68 are T-shaped. The stem 80 of the T-shaped clamping surface is sized such that both the left side and right side of the key blank 24 blade 32 is exposed to the cutting wheels 60 and 62 when the blank 24 is clamped in the clamping assembly 64. The bar portion 82 of the T-shaped clamping surface is designed to engage the blank 24 at or above the key shoulder 30 and above the portion of the blade 32 into which a key pattern is cut. Optionally, the clamping surface may include knurls or other features designed to improve the grip of the clamp members 66 and 68 on the blank 24. As best seen in FIG. 12, the top clamp member 66 may include at least one groove 84 designed to allow a top clamp member 66 to deflect slightly. Such slight deflections may allow the clamping surfaces of the clamp members 66 and 68 to adjust for small irregularities in the surface of the blank 24. For example, the top clamp member 66 may displace slightly so as to accommodate raised logos, words, or numbers stamped or forged into the surface of the blank 24. Such accommodations may reduce or eliminate the chance of point contact between the clamping members 66 and 68 and the blank 24 and increase the chances that the clamping force is sufficient to hold the blank 24 during the cutting process.

Once the key blank 24 is clamped, the cutting operation can be performed. The logic may use the quantified and stored information from the captured image of the key pattern 36 of the master key 22 to calculate precise movements of the cutting wheels 60 and 62, with respect to the key blank 24, to produce a duplicate key. The movements of the cutting wheels 60 and 62 are generally two-dimensional. The wheels 60 and 62 are moved along the X-axis to cut the key pattern along the length of the blade 32. In addition, the wheels 60 and 62 move independently along the Y-axis to cut the depth of each tooth of the key pattern into the blade 32. While numerous paths for the cutting wheels 60 and 62 may be utilized, in an embodiment, the cutting wheels 60 and 62 begin near the shoulder 30 of the key blank 24 and proceed to the tip of the key blank 24 blade 32 to cut the key pattern into the blade 32. The precise movements calculated for the cutting wheels 60 and 62 may be transferred to a 2-axis CNC cutter so that the key pattern 36 of the master key 22 may be duplicated on the blade 32 of the key blank 24.

Figure 14:
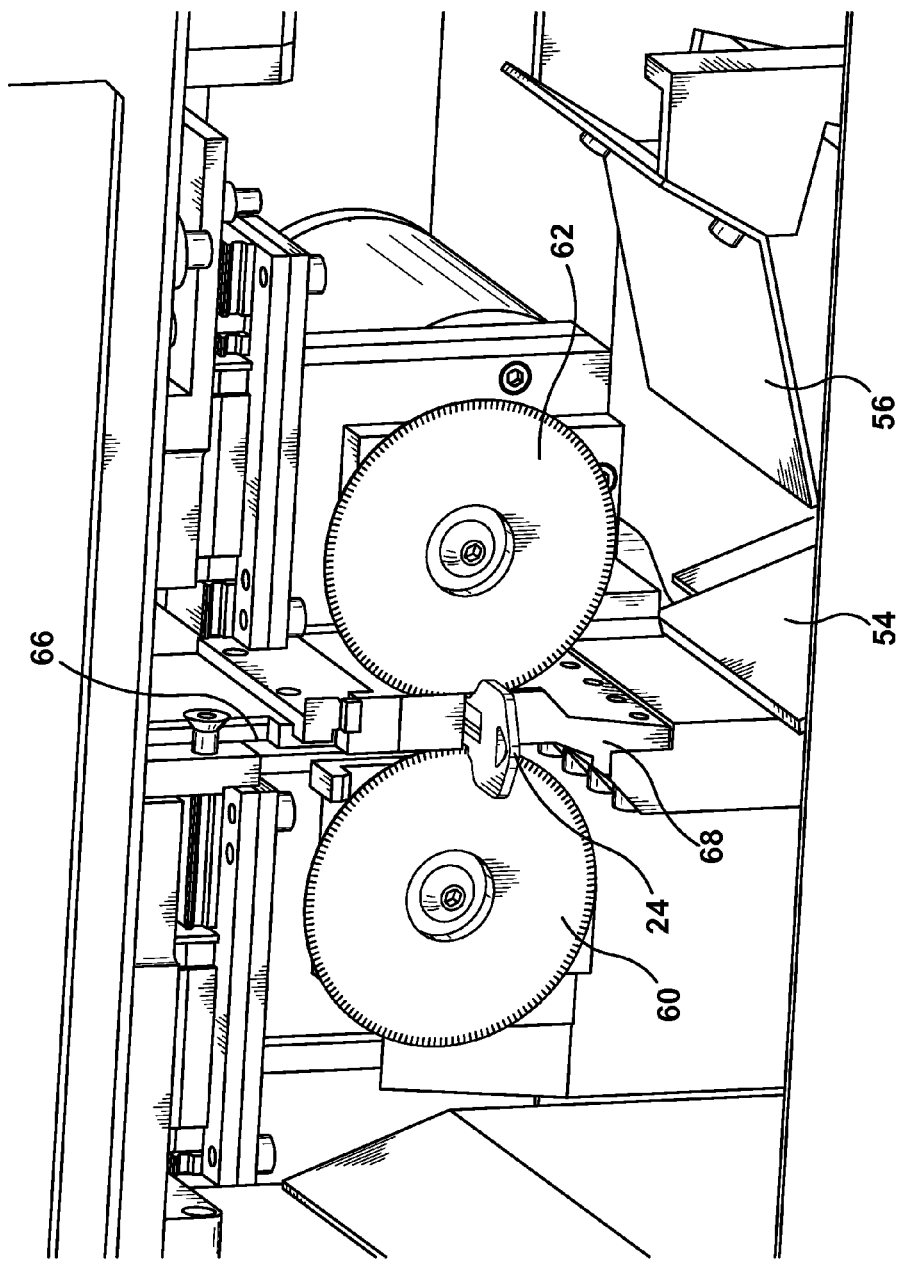
FIG. 14 is a partial perspective view of the interior of the key duplication machine of FIG. 1.
Figure 15:
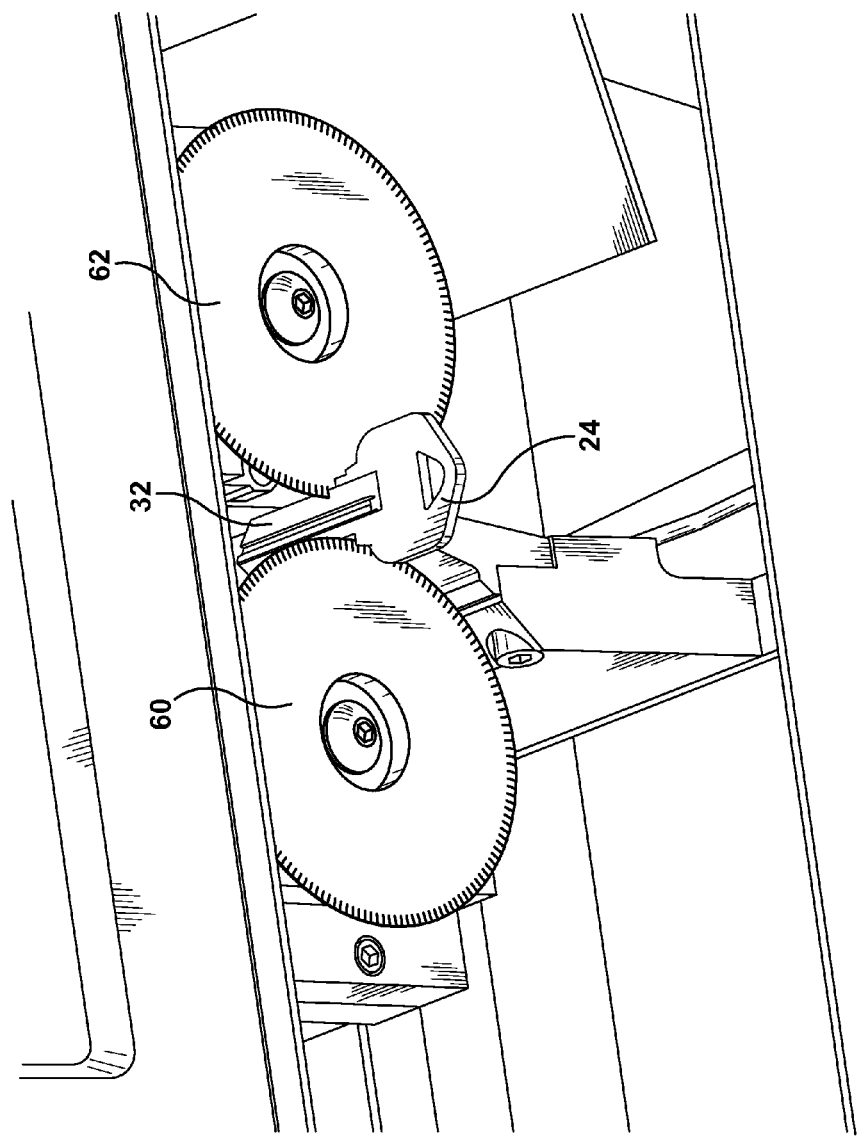
FIG. 15 is a partial perspective view of the interior of the key duplication machine of FIG. 1.

As shown in FIGS. 14 and 15, once the key blank 24 is clamped and the positioning fingers 72 and 74 are rotated out of the way, the cutting wheels 60 and 62 may be moved along the Y-axis, into the cutting zone, and into engagement with the blade 32. Typically, the wheels 60 and 62 engage the blank 24 near the shoulder 30 of the blank 24. The clamp assembly 64 is not shown in FIG. 15 for clarity. As previously described, the cutting wheels 60 and 62 may move in parallel along the X-axis as the key pattern is cut into the blank 24; however, the movements of each cutting wheel 60 and 62 along the Y-axis are independent. This independent movement insures that a double-sided key may be produced quickly and efficiently, with the cutting wheels 60 and 62 passing along the length of the blade 32 only once. The rotational speed of each cutting wheel 60 and 62 is also independently controlled. In one embodiment, the rotational speed of each cutting wheel 60 and 62 is adjusted based on the depth at which the cutting wheel 60 and 62 is moved into the blade 32 along the Y-axis. For example, in an embodiment, the rotational speed of a cutting wheel 60 and 62 is slowed as the wheel 60 and 62 moves deeper into the blade 32 along the Y-axis. In an embodiment, the movement of the wheels 60 and 62 along the X-axis and Y-axis are adjusted based on the features of the cut. For example, for deeper cuts into the blade 24, the movement of the wheels 60 and 62 in the Y-direction may be slowed, and for shallower cuts, the movement of the wheels 60 and 62 in the Y-direction may be increased. Such arrangements limit wear and service time of the cutting wheels 60 and 62.

If the master key 22 is a single-sided key, only one of the cutting wheels 60 and 62 is engaged with the blank 24 to cut the key pattern 36. The logic may make a determination on whether the left 60 or right 62 cutting wheel is to be utilized based on the captured image of the key blank 24. The user may insert the blank 24 into the slot 20 without regard to the orientation of the blade 24. The logic may determine from the captured image whether the key pattern should be cut into the left edge or the right edge of the key blank 24 based on the contour and shape of the shoulder 30 of the blade 32, the tip of the blade 32, or any other characteristic that may distinguish the edges of the blade 32.

Once the key pattern is cut into the key blank 24, the top clamp member 66 may be lifted along the Z-axis, releasing the newly-cut key. The newly-cut key remains secured by the retention mechanism 19. The newly-cut key may be returned to the imaging zone by moving the retention mechanism panel 21 to the right along the Y-axis. A new image of the newly-cut key may be captured and compared to the captured image of the master key 22. Logic may utilize such a comparison to validate that the newly-cut key is within acceptable deviation from the master key 22. The deviation of the newly-cut key as compared to the master key 22 may be quantified by any statistic method. For example, a number of measurements along the key pattern 36 of the master key and the key pattern of the newly-cut key may be taken and quantified. The average difference of the comparable measurements may be used to calculate an average difference and compare that average difference to a predetermined limit. The results of such a validation may be displayed to the user on the touch-screen monitor 40 or otherwise output to the user.

Once the validation is completed, the user may lift the spring-biased door clamp 14 using the handle 18 and remove the newly-cut key from the slot 20. The logic may be arranged to retain the captured image of the master key 22 for a period of time, such that the user may place another proper key blank 24 into the slot 20 and cut yet another duplicate key. If no additional duplicate keys are required, the logic may discard the captured image of the master key 22 and prepare to receive another master key 22 and begin the duplication process anew. Such processes may be driven by the logic with regard to time limits or may be driven by the user inputting information through a touch screen or other user interface.

Figure 16:
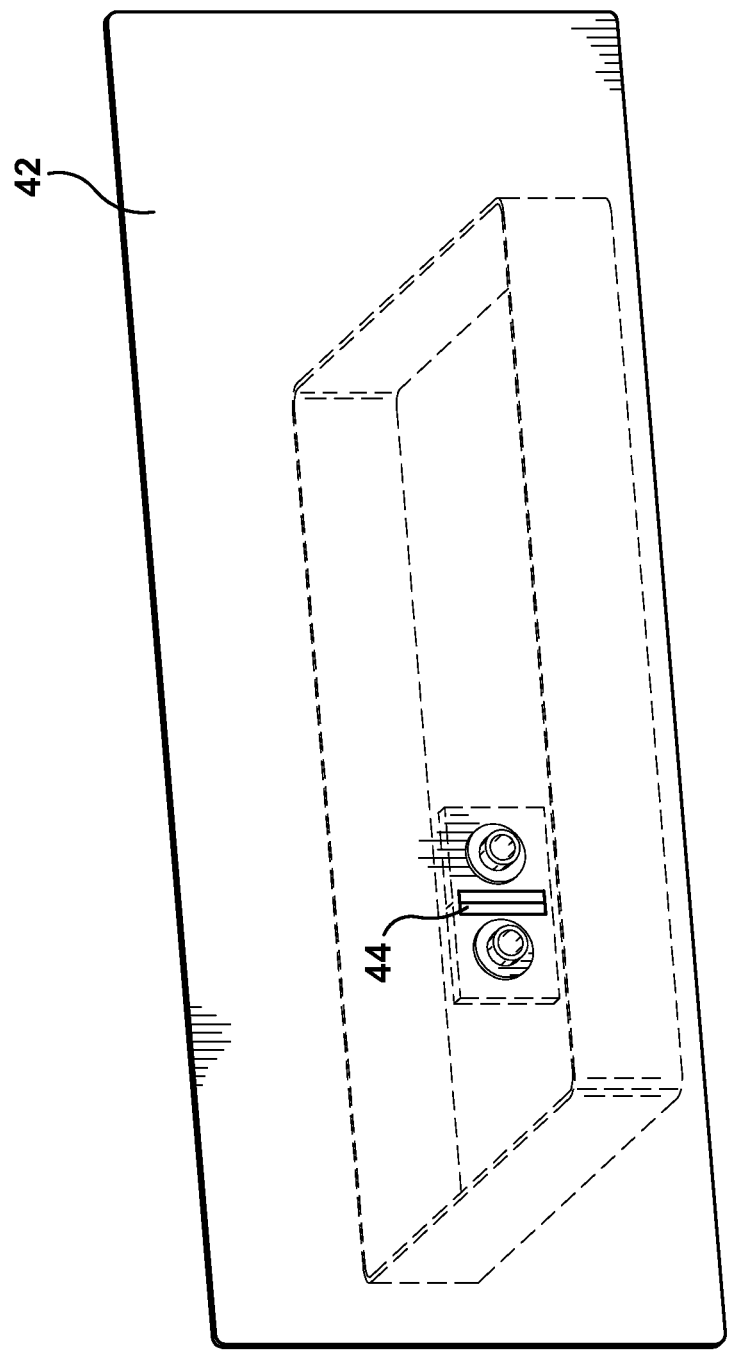
FIG. 16 is a front view of a shavings drawer of the key duplication machine of FIG. 1.
Figure 17:
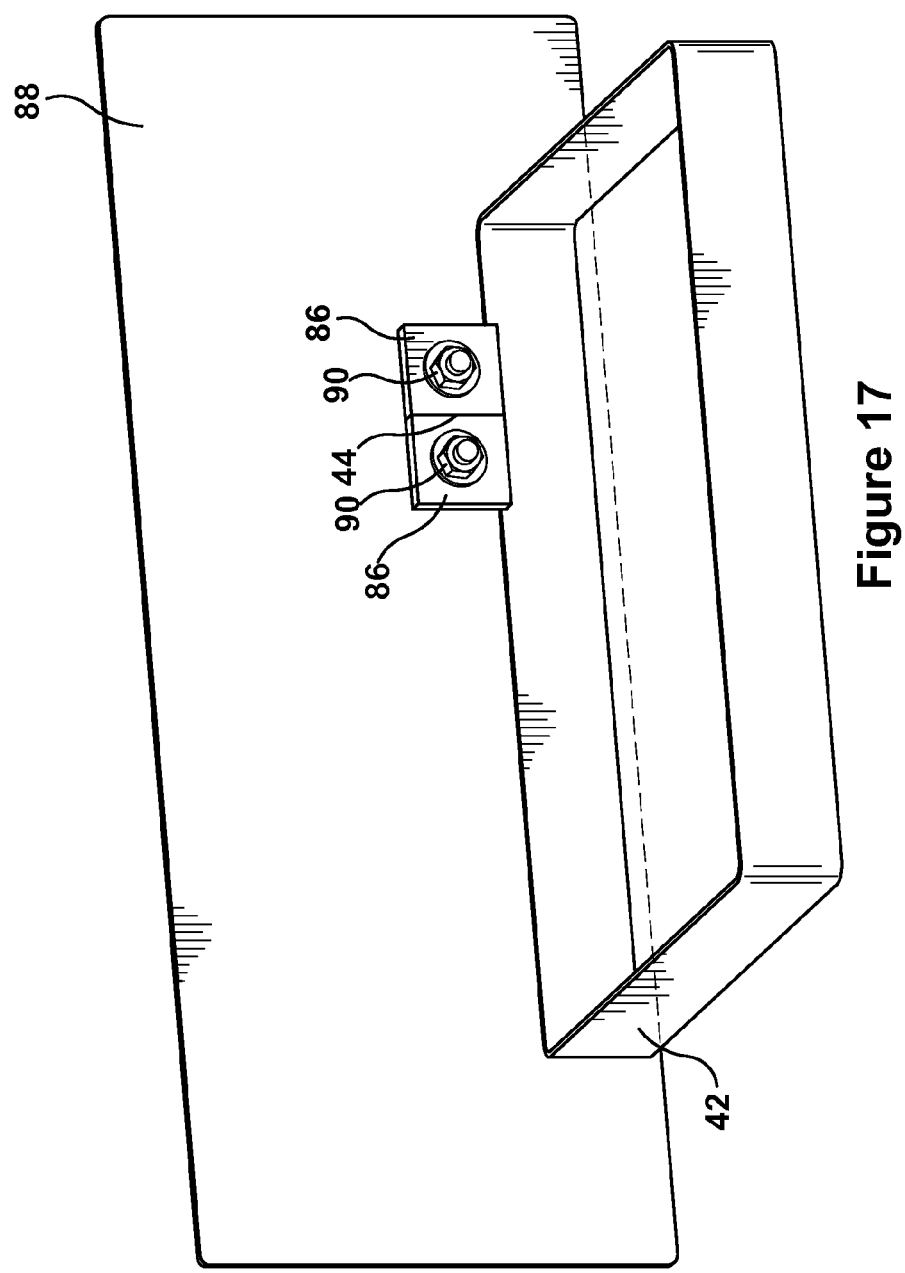
FIG. 17 is a rear view of a shavings drawer of the key duplication machine of FIG. 1.

When a newly-cut key is removed from machine, the user may de-burr the key by inserting the blade of the newly-cut key into the de-burring slot 44. As shown in FIGS. 16 and 17, a pair of de-burring brushes 86 may be secured to an interior surface 88 of the shaving drawer 42 and proximate to the de-burring slot 44. The brushes 86 are positioned such that the blade of the newly-cut key engages the brushes as the blade is inserted into the slot 44. As seen in FIG. 17, the brushes may be square and secured to an interior surface 88 of the shavings drawer 42 with fasteners 90 such as, for example, a bolt and nut combination. Such a fastening arrangement allows for efficient exchanging of de-burring brushes 86. In addition, the square shape of the brushes 86 allows the brushes 86 to be rotated or flipped as one side of a brush 86 becomes worn due to repeated use, thus increasing the service life of a brush 86. Such an arrangement may provide for sixteen unique positions for the pair of brushes 86.

Figure 18:
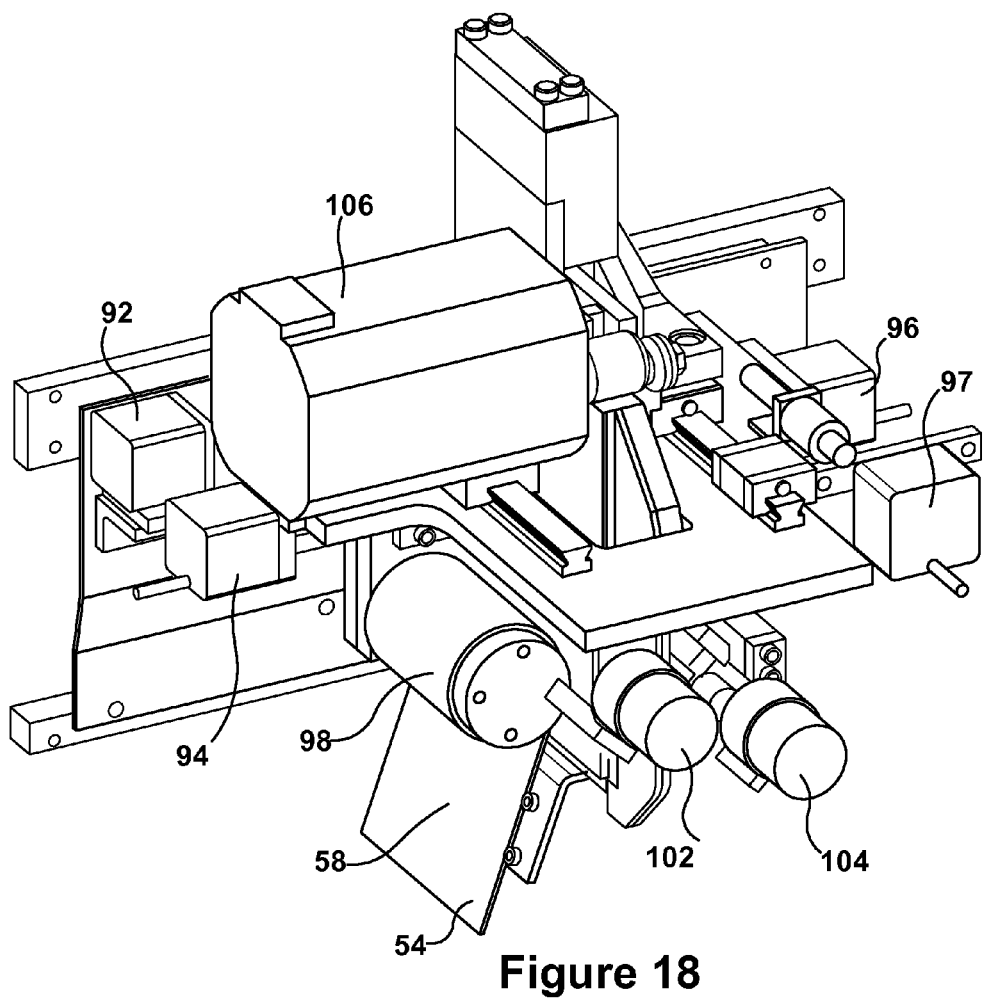
FIG. 18 is a partial perspective view of the interior of the key duplication machine of FIG. 1.
Figure 19:
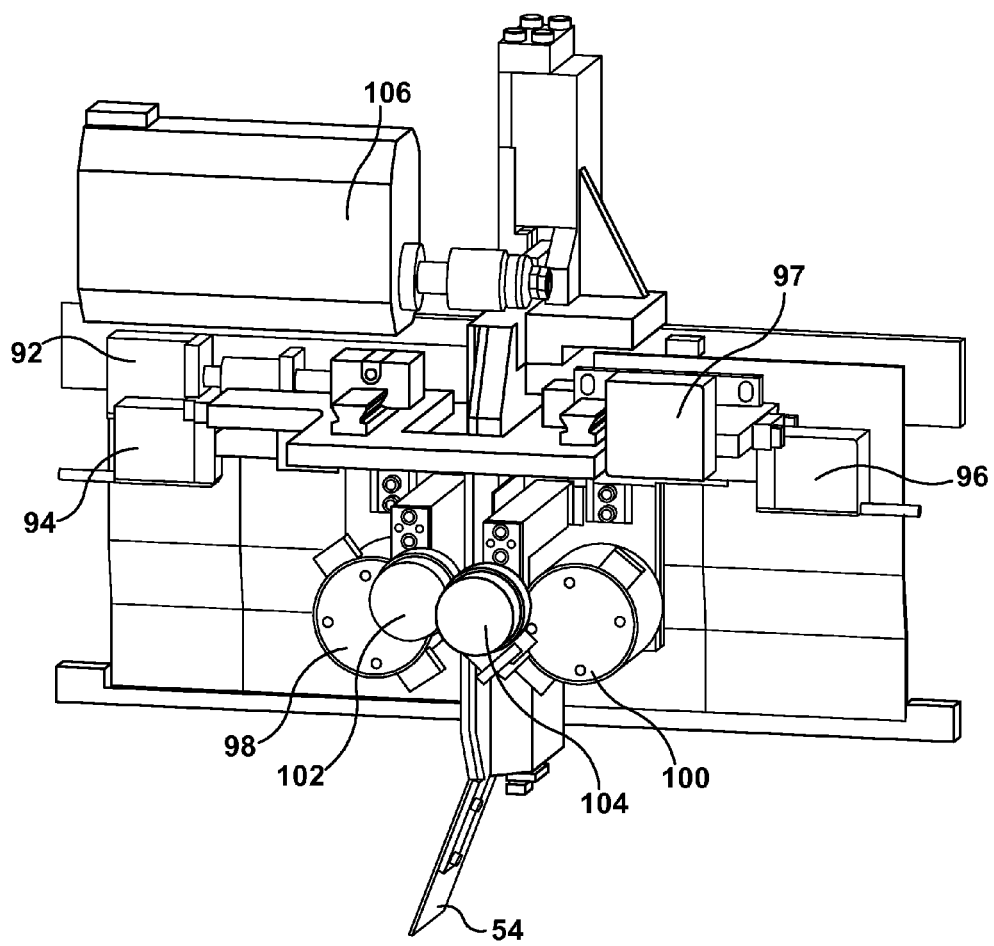
FIG. 19 is a partial perspective view of the interior of the key duplication machine of FIG. 1.

As described above, the process of cutting duplicate keys relies on the movement of numerous interior components, mechanisms, and systems. Such movement is generally facilitated through a number of motors mounted within the key duplication machine 10. FIGS. 18 and 19 illustrate the interior of the machine 10 as viewed from the rear of the machine 10. As shown in FIGS. 18 and 19, the key duplication machine 10 includes nine independent motors to facilitate movement within the machine 10.

A retention mechanism slide motor 92 is coupled to the retention mechanism panel 21 to move the retention mechanism panel 21 along the Y-axis. Such movement occurs as a key blank 24 is moved between the imaging zone and the cutting zone.

A first slide motor 94 is coupled to both the right cutting wheel 62 and the right positioner finger 74 to move the right cutting wheel 62 and the right positioner finger 74 along the Y-axis. A second slide motor 96 is coupled to both the left cutting wheel 60 and the left positioner finger 72 to move the left cutting wheel 60 and the left positioner finger 72 along the Y-axis. Such movement of the positioner fingers 72 and 74 and the cutting wheels 60 and 62 occur under a number of conditions. For example, when the fingers 72 and 74 are engaged with the blade 32 of a key blank 24, movement of the fingers 72 and 74 along the Y-axis may move the blank 24 between the imaging zone and the cutting zone. In another example, when a key blank 24 is secured in the clamping assembly 64 and the fingers 72 and 74 are rotated out of engagement with the blade 32, the cutting wheels 60 and 62 may be independently moved along the Y-axis to facilitate the cutting of the key pattern 36 into the blade 32.

A third slide motor 97 is coupled to both the left 60 and right 62 cutting wheels to move the cutting wheels 60 and 62 together along the X-axis. Such movement along the X-axis occurs as the wheels 60 and 62 move along the length of the blade 32 to cut the key pattern 36 into the blade.

A first rotational motor 98 is coupled to the right cutting wheel 62 to rotate the right cutting wheel 62 about the X-axis as the wheel 62 cuts a key pattern 36 into the right edge of a key blank 24 blade 32. A second rotational motor 100 is coupled to the left cutting wheel 60 to rotate the left cutting wheel 60 about the X-axis as the wheel 60 cuts a key pattern 36 into the left edge of a key blank 24 blade 32.

A third rotational motor 102 is coupled to the right positional finger 74 to rotate the finger 74 about the X-axis to engage and disengage the finger 74 with the blade 32 of the key blank 24. A fourth rotational motor 104 is coupled to the left positional finger 72 to rotate the finger 72 about the X-axis to engage and disengage the finger 72 with the blade 32 of the key blank 24.

A clamp motor 106 is coupled to the top clamp member 66 to move the top clamp member 66 along the Z-axis. Such movement clamps and unclamps a key blank 24 in the clamp assembly 64 prior to and after the cutting of key patterns 36 into the blade 32 of a blank 24.

Figure 20:
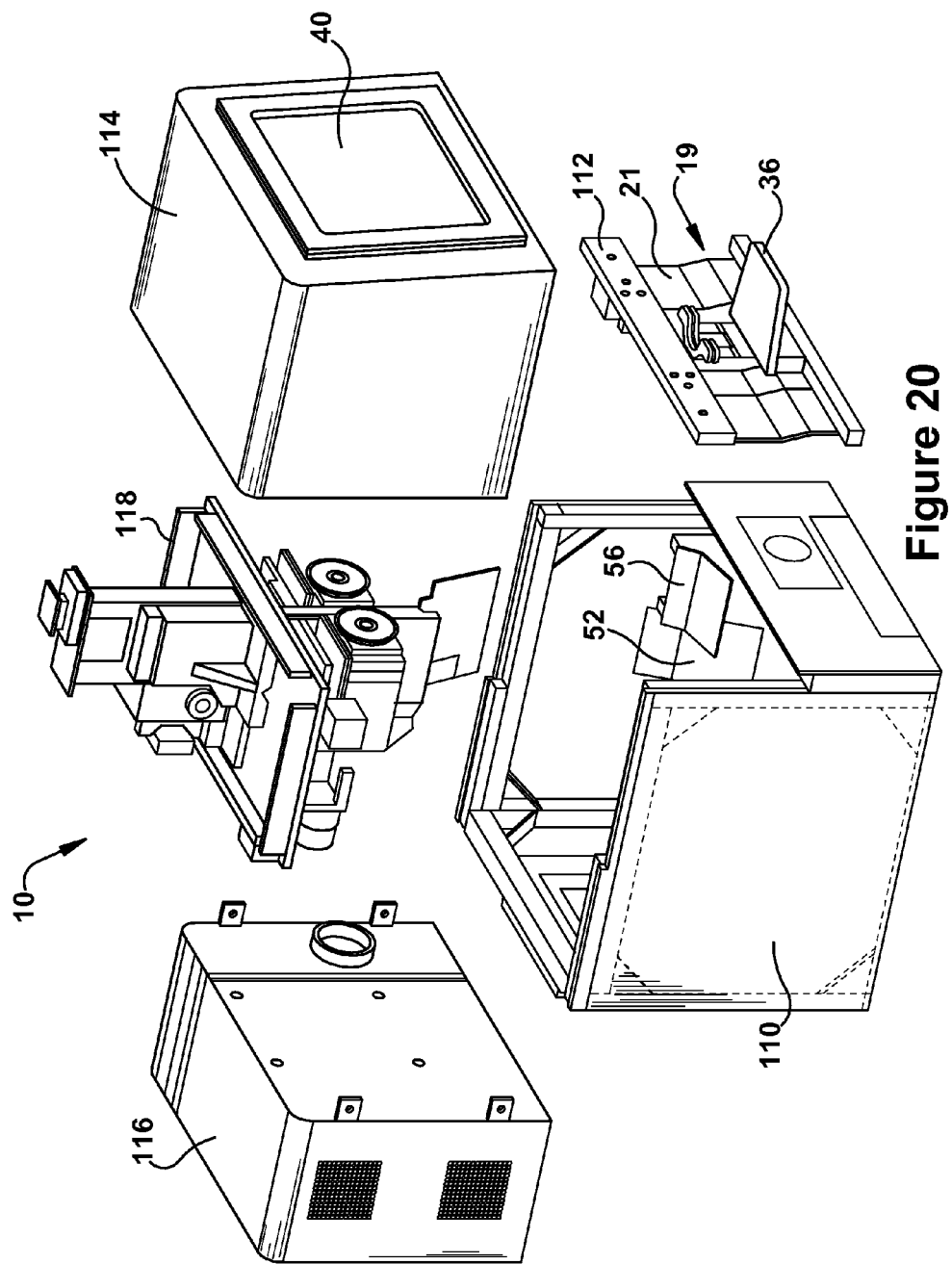
FIG. 20 is an exploded view of the key duplication machine of FIG. 1.
Figure 21:
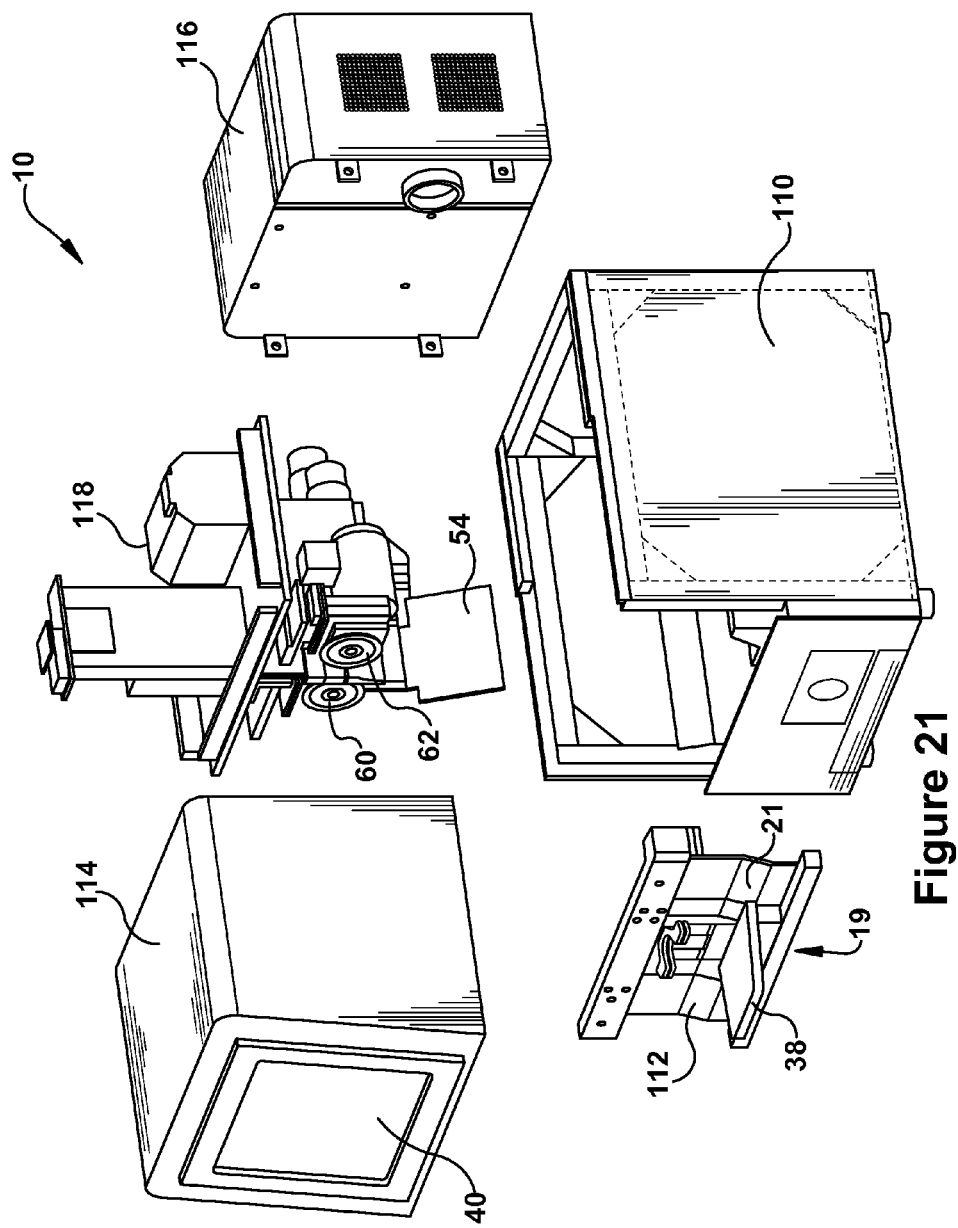
FIG. 21 is an exploded view of the key duplication machine of FIG. 1.

The key duplication machine 10 as described herein may be designed and fabricated as an assembly of modular components. In an embodiment, as shown in FIGS. 20 and 21, the machine 10 may be assembled from five modular components. Such modular components may include a base module 110, a front panel module 112, a hood module 114, a computer module 116, and a support plate module 118. The base module 110 supports the machine 10 and may provide structural support for the mounting or holding of components such as, for example, the shavings drawer 42 and the lighting panel 52. The front panel module 112 may provide structural support for the mounting or holding of components such as, for example, the door clamp 14, base 16, handle 18, retention mechanism panel 21, and retention mechanism slide motor 92. The hood module 114 may provide structural support for the mounting or holding of components such as, for example, the monitor 40, wiring chassis, and power supplies. The computer module 116 may provide structural support for the mounting or holding of components such as, for example, a hard drive, a central processing unit, circuit boards, logic units, and other such computer related components. The support plate module 118 may provide structural support for the mounting or holding of internal components of the machine 10. For example, the support plate module 118 may support a number of motors, such as the rotational motors 98, 100, 102, and 104 for rotating the cutting wheels 60 and 62 and positioner fingers 72 and 74; slide motors for positioning the wheels and positioner fingers 94, 96, and 97; and the clamp motor 106. In addition, the support plate module 118 may support components such as the optical imaging device 50, reflector plate 54, the cutting wheels 60 and 62, positioner fingers 72 and 74, etc. Such modular design and assembly increases the ease of manufacture, assembly, and maintenance of a key duplication machine 10.

Figure 22:
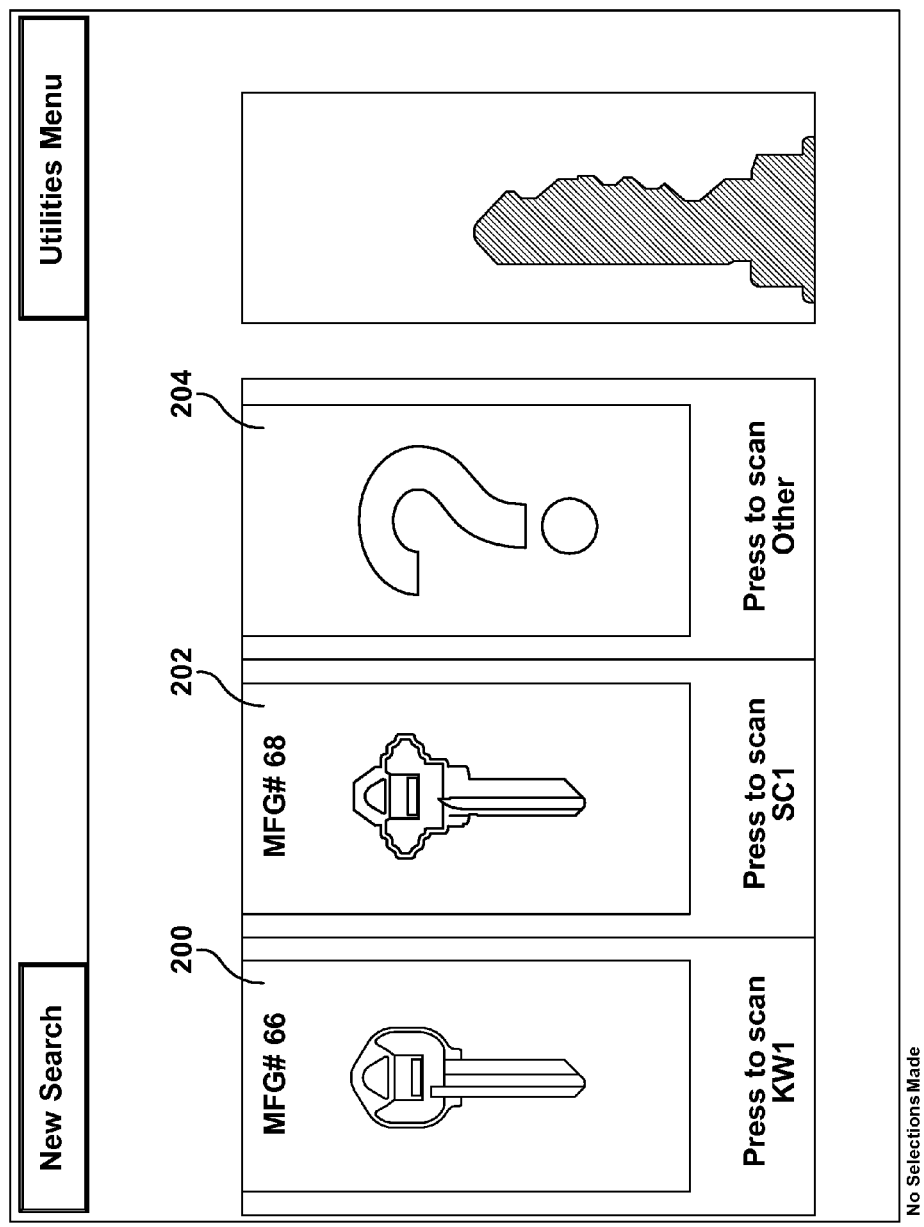
FIG. 22 is a screen shot of a user interface for use with the key duplication machine of claim 1.

The process of duplicating a key using the key duplication machine 10 as described above may be facilitated through the interaction of a user with a user interface. For example, the user may be given a number of optional methods for identifying a proper key blank for the duplication of a master key. Such options may be displayed on a user interface such as, for example, a touch-screen monitor. Once displayed on a touch-screen monitor, the user may initiate the duplication process by manually selecting one of the offered options. A first option may request that the key duplication machine determine the proper key blank by taking a photograph of the master key, as described herein, and comparing the physical characteristics of the master key to a database containing physical characteristics of key blanks. The results of such a comparison may yield more than one potentially appropriate key blank. As illustrated in FIG. 22, the user interface may graphically display two or more key blanks that may be used to duplicate the master key. The user may select the preferred key blank by touching a graphic representation of one of the key blanks 200 and 202. Alternatively, the user may select a graphic 204 indicating the user intends to insert another master key into the machine.

Figure 23:
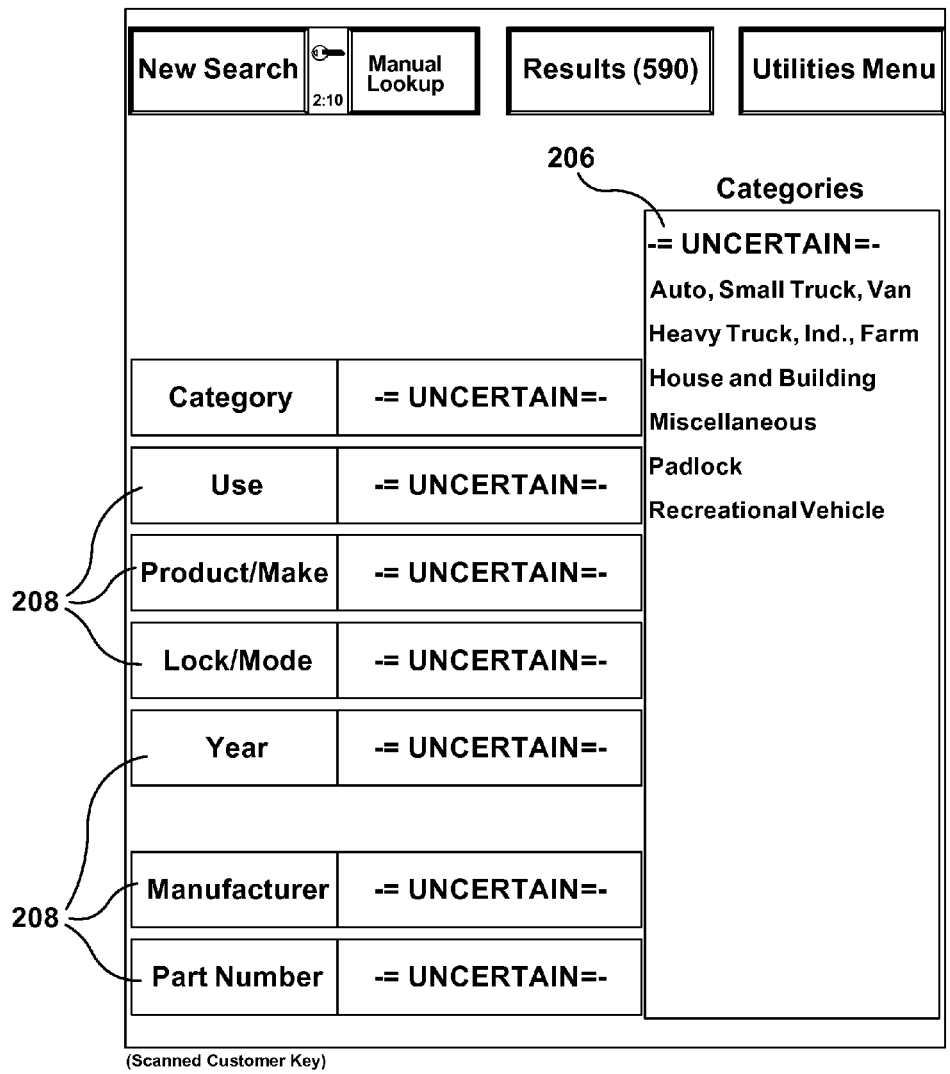
FIG. 23 is a screen shot of a user interface for use with the key duplication machine of claim 1.

Another option for identifying a proper key blank for the duplication of a master key is for a user to provide specific known information regarding the master key. As shown in FIG. 23, the user may enter specific information regarding a master key through a touch-screen monitor. The user may select specific information regarding a key from a dynamically populated selection box 206. The user may utilize the selection box to provide information such as the category of the key (automobile, house, padlock, etc.), the use, the make, the model of lock, the year lock was manufactured, the name of the manufacturer, or the part number of key or lock. The user may toggle the information displayed in the selection box 206 by touching buttons 208 associated with the different types of information. The user may select information for the selection box 206 by simply touching the correct information in the selection box 206.

Figure 24:
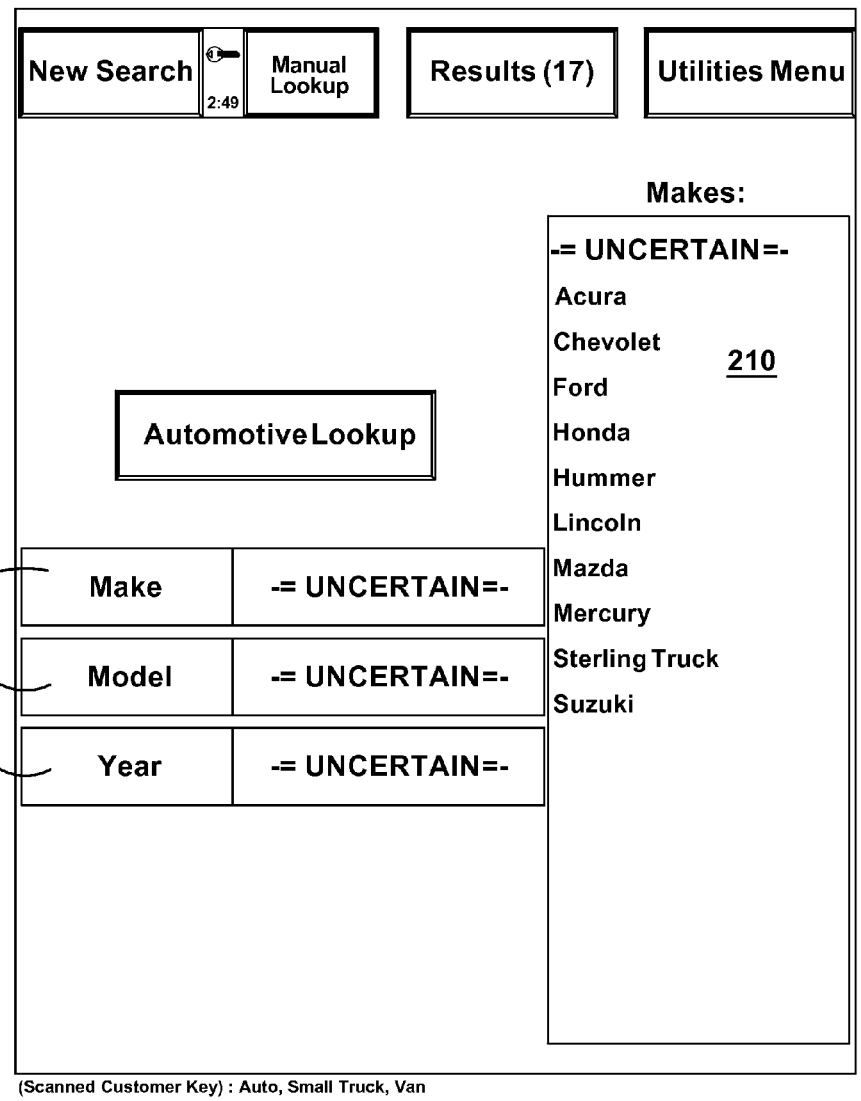
FIG. 24 is a screen shot of a user interface for use with the key duplication machine of claim 1.

FIG. 24 illustrates a user interface directed specifically to automobile keys. The user may enter specific information regarding an automobile master key to identify the proper key blank. The user may select information such as automobile make, model, and model year from a dynamically populated selection box 210. The information in the selection box 210 may be toggled by touching an automobile make button 212, an automobile model button 214, and a model year button 216.

In each of the options described above, specific information entered by the user may be compared to a database containing information regarding key blanks. Such a comparison may be used to identify the proper key blank. Once the proper key blank is identified, the key blank may be displayed on the user interface to inform the user which key blank should be retrieved by the user.

Regardless of the method used to identify a key blank, the machine may be arranged to warn a user that a master key to be copied may contain a computer chip, transponder, or the like. Such computer chips and transponders are common in automobile keys. Duplicates for such keys may need to include a corresponding computer chip in order for the duplicate to be successful. Once it is determined that a master key may have a computer chip, the user may be instructed to place the master key in or near a device designed to sense the presence of a computer chip in a key. If the master key does include a computer chip, the user may be instructed on how to proceed to ensure a functional duplicate key is made.

Figure 25:
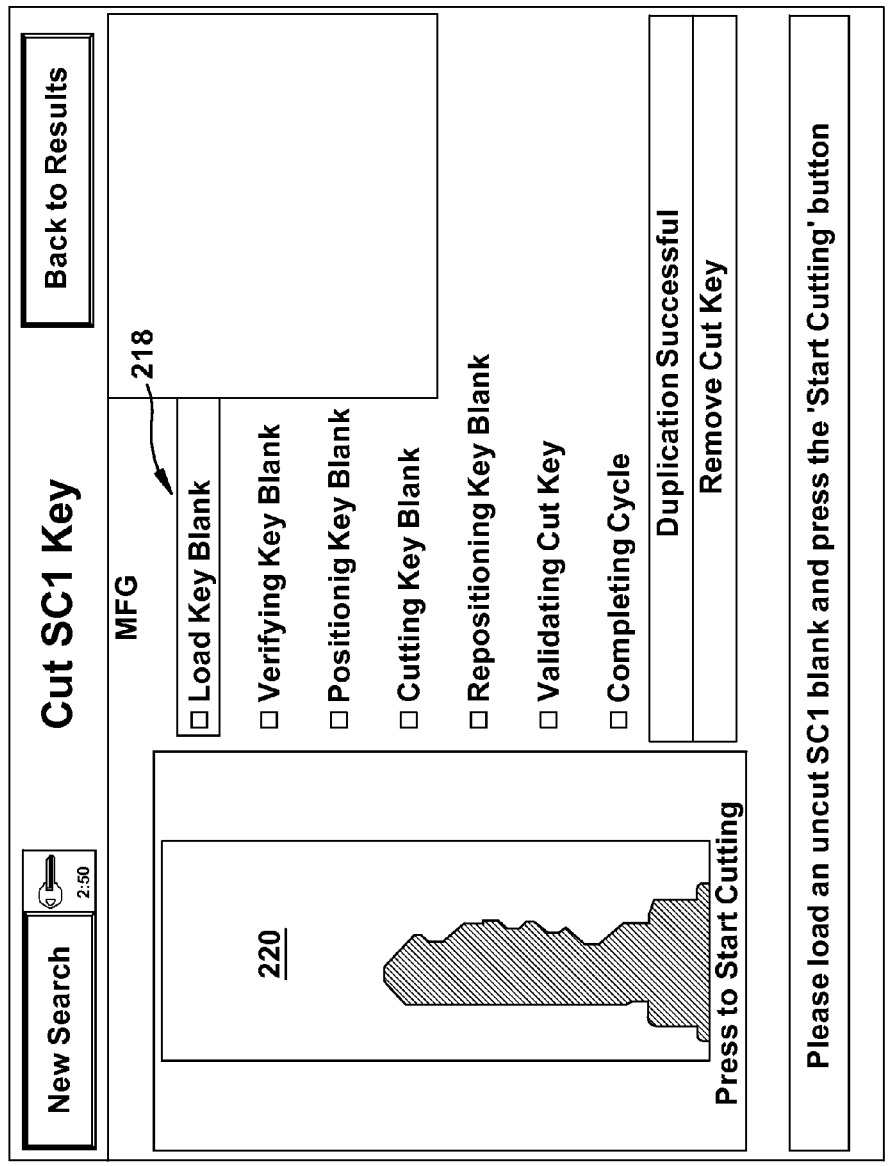
FIG. 25 is a screen shot of a user interface for use with the key duplication machine of claim 1.
Figure 26:
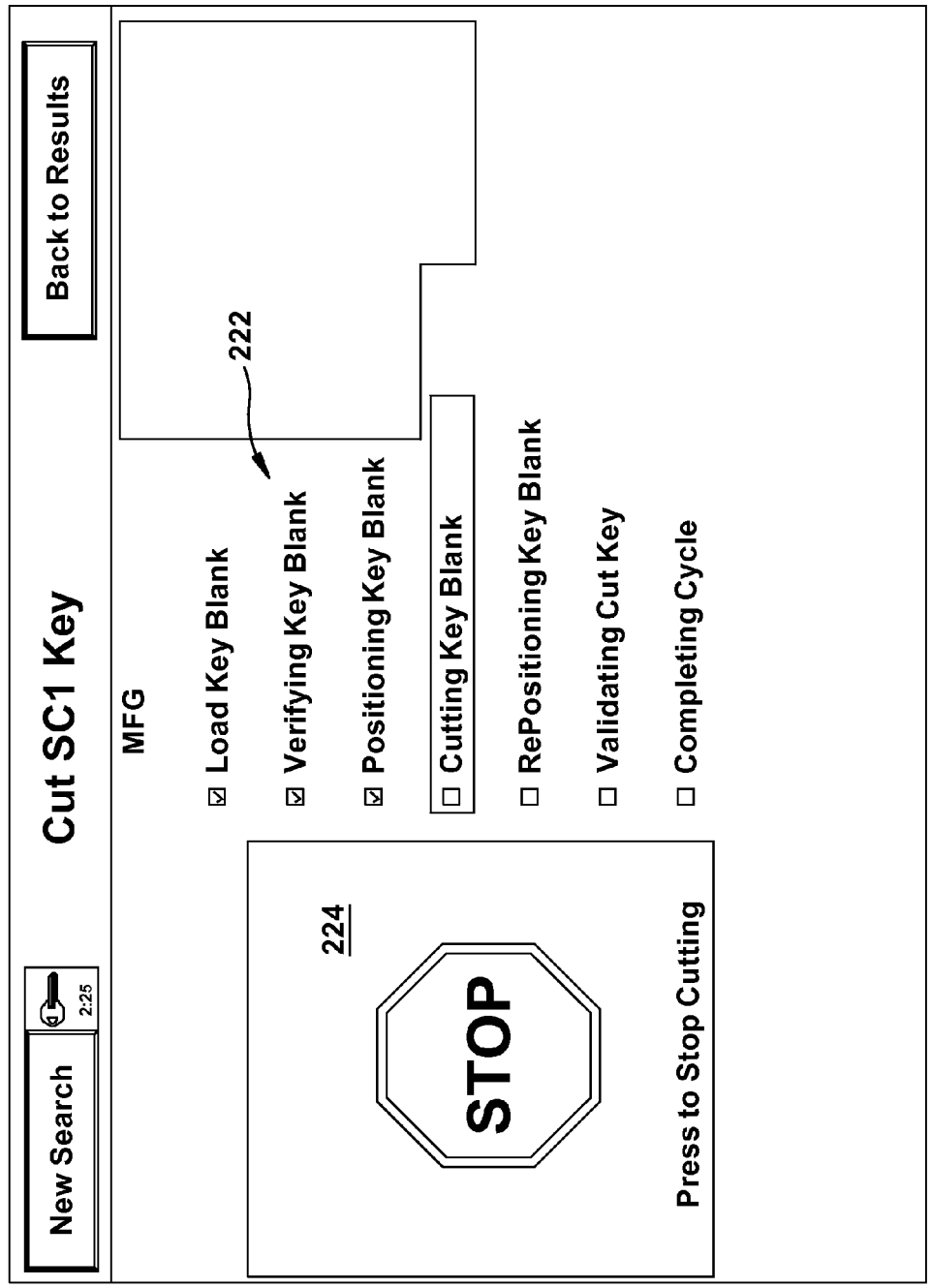
FIG. 26 is a screen shot of a user interface for use with the key duplication machine of claim 1.

Once a proper key blank is identified and retrieved by the user, the user interface may further guide the user in duplicating the master key and displaying the progress of duplication of the key. As shown in FIG. 25, a list of actions 218 may be displayed on the user interface. The first action shown instructs the user to load a key blank. The user may remove the master key and insert the proper key blank and press a box 220 to initiate the key duplication process. The key duplication machine 10 may then proceed with additional actions such as scanning the blank and verifying the proper blank is loaded, positioning the key blank to insure proper alignment, cutting the key blank, etc. As shown in FIG. 26, as actions are completed, checks may be displayed in boxes 222 to indicate that an action has been completed. The user interface may also include a graphic to terminate the cutting process. For example, a user may touch a graphic of a stop sign 224 to stop the cutting process.

The logic may be arranged to collect and store data regarding key duplications performed by the key duplication machine 10. For example, data regarding the number of key duplications performed, the number of different key blanks used in key duplication, the number of an individual key blank used in key duplication, success rate of duplicating keys, and the like may be collected and stored. Such information and data may be analyzed by the logic associated with the machine 10 or be downloaded for remote analysis.

We claim:

1. An assembly for validating a cut key with respect to a master key, said assembly comprising:
    an outer shell for housing at least one optical imaging device for capturing optical images of at least a portion of said cut key and at least a portion of said master key;
    a slot within the outer shell for receiving at least a portion of said cut key and a portion of said master key; and
    a logic for comparing said cut key pattern with respect to said master key pattern.

2. The assembly of claim 1, wherein said cut key pattern is a duplication of said master key pattern.

3. The assembly of claim 2, wherein said logic determines if said cut key pattern is within acceptable deviation from said master key pattern.

4. The assembly of claim 1, wherein said optical image is a digital image.

5. The assembly of claim 1, further comprising a user interface for providing output to a user.

6. The assembly of claim 1, wherein said optical images include portions of both said cut key and said master key within the same image.

7. The assembly of claim 1, further comprising a retention mechanism for securing the cut key in an imaging zone.

8. The assembly of claim 7, further comprising a cutting member configured to cut a key pattern into the cut key at a key clamping position.

9. The assembly of claim 8, wherein the imaging zone is the same as the key clamping position.

10. The assembly of claim 1, wherein the logic includes at least one of a software controlled microprocessor, an application specific integrated circuit, an analog circuit, a digital circuit, a programmed logic device, and a memory device containing instruction.

11. A method for validating a cut key with respect to a master key, said method comprising:
    providing a housing having an opening for receiving a master key and a cut key;
    retaining a master key within an imaging zone;
    capturing at least one optical image of at least a portion of said master key with an optical imaging device;
    retaining a cut key within said imaging zone;
    capturing at least one optical image of at least a portion of said cut key with said optical imaging device;
    providing logic to compare said cut key pattern with respect to said master key pattern; and
    comparing said cut key pattern with respect to said master key pattern.

12. The method of claim 11, wherein said cut key pattern is a duplication of said master key pattern.

13. The method of claim 12, further comprising determining if said cut key pattern is within acceptable deviation from said master key pattern.

14. The method of claim 11, further comprising outputting a comparison of said cut key pattern with respect to said master key pattern to a user.

15. The method of claim 11, wherein the logic includes at least one of software controlled microprocessor, an application specific integrated circuit, an analog circuit, a digital circuit, a programmed logic device, and a memory device containing instruction.

16. An identification system for duplicating keys, comprising:
    an outer shell having a slot formed therein to receive a master key and a cut key;
    a retention mechanism disposed within the housing and configured to receive at least a portion of said master key and said cut key;
    an imaging system configured to measure the thickness of a master key pattern and said cut key after the master key or cut key has been received by the retention mechanism;
    a logic for comparing a thickness of a cut key pattern with respect to said master key pattern.

* * * * *